US011682763B2

(12) United States Patent
Wu et al.

(10) Patent No.: US 11,682,763 B2
(45) Date of Patent: Jun. 20, 2023

(54) ELECTRODE AND ELECTRODE MATERIAL COMPRISING SULFUR-LIMONENE POLYSULFIDE FOR LITHIUM-SULFUR BATTERIES

(71) Applicant: Max-Planck-Gesellschaft zur Förderung der Wissenschaften e.V., Munich (DE)

(72) Inventors: Feixiang Wu, Huran (CN); Yan Yu, Anhui (CN); Joachim Maier, Wiernsheim (DE)

(73) Assignee: MAX-PLANCK-GESELLSCHAFT ZUR FÖRDERUNG DER WISSENSCHAFTEN E. V., Munich (DE)

( * ) Notice: Subject to any disclaimer, the term of this patent is extended or adjusted under 35 U.S.C. 154(b) by 497 days.

(21) Appl. No.: 16/968,107

(22) PCT Filed: Feb. 6, 2019

(86) PCT No.: PCT/EP2019/052904
§ 371 (c)(1),
(2) Date: Aug. 6, 2020

(87) PCT Pub. No.: WO2019/154854
PCT Pub. Date: Aug. 15, 2019

(65) Prior Publication Data
US 2021/0376322 A1    Dec. 2, 2021

(30) Foreign Application Priority Data

Feb. 8, 2018   (EP) .................................... 18155768

(51) Int. Cl.
*H01M 4/58*   (2010.01)
*H01M 4/04*   (2006.01)
(Continued)

(52) U.S. Cl.
CPC .......... *H01M 4/5815* (2013.01); *H01M 4/04* (2013.01); *H01M 4/382* (2013.01); *H01M 4/583* (2013.01); *H01M 10/052* (2013.01)

(58) Field of Classification Search
None
See application file for complete search history.

(56) References Cited

U.S. PATENT DOCUMENTS

| 2014/0199592 A1* | 7/2014 | Pyun | ................... | H01M 4/0404 |
| | | | | 252/511 |
| 2018/0148346 A1* | 5/2018 | Chalker | ............... | B01J 20/3085 |
| 2018/0208686 A1* | 7/2018 | Pyun | ....................... | C08L 81/00 |

FOREIGN PATENT DOCUMENTS

WO     2016064615 A1    4/2016

OTHER PUBLICATIONS

Crockett, M. P., et al., "Sulfur-Limonene Polysulfide: A Material Synthesized Entirely form Industrial by-Products and its Use in Removing Toxic Metals from Water and Soil," Angewandte Chemie, International Edition, Jan. 26, 2016 pp. 1714-1718.

(Continued)

Primary Examiner — Robert S Carrico
(74) Attorney, Agent, or Firm — Dentons Durham Jones Pinegar; Sarah W. Matthews

(57) ABSTRACT

The present invention relates to an electrode material comprising at least one sulfur-limonene sulfide component or a composite of the sulfur-limonene sulfide component with a first conductive component; electrodes, in particular cathodes, containing the electrode material; half-cells, cells, and batteries containing the electrodes; and processes for obtaining the electrode material, the electrode, the half-cell, the cell, and the battery comprising electrode material and/or electrodes of the present invention.

20 Claims, 13 Drawing Sheets

Figure 1:
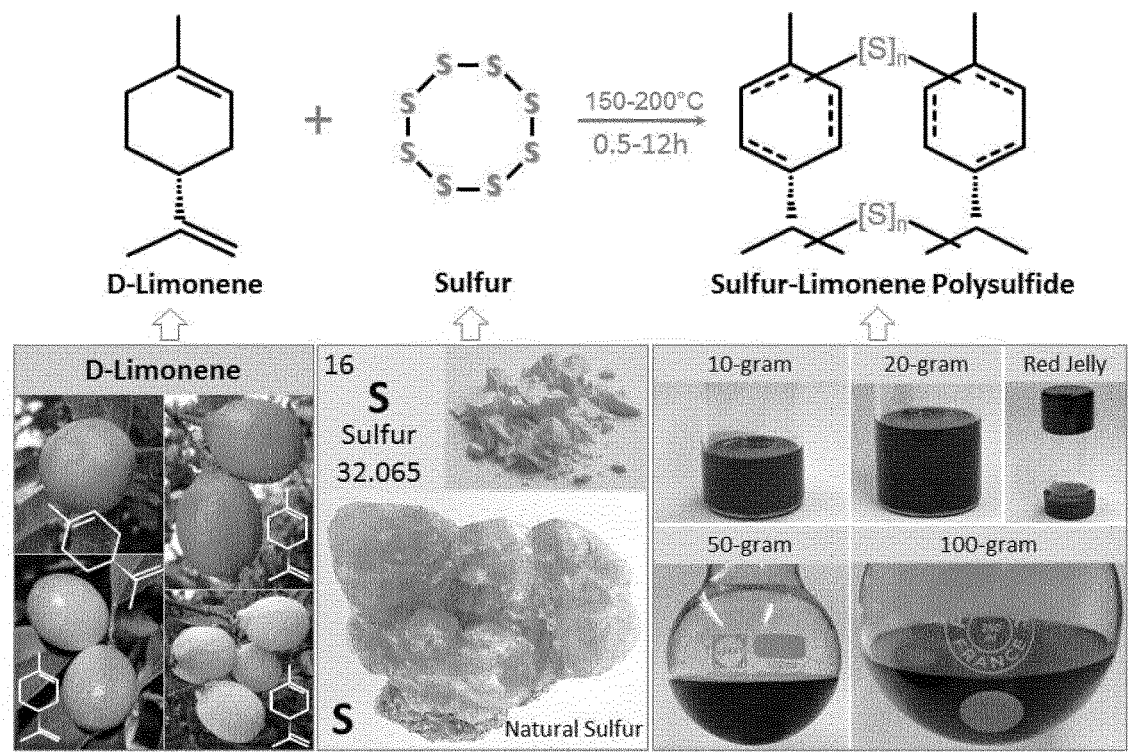

(51) Int. Cl.
    *H01M 4/38*      (2006.01)
    *H01M 4/583*     (2010.01)
    *H01M 10/052*    (2010.01)

(56)         References Cited

OTHER PUBLICATIONS

Wu, R., et al., "A Sulfur-Limonene-Based Electrode for Lithium-Sulfur batteries: High-Performance by Self-Protection," Advanced Materials, Feb. 14, 2018.
European Patent Office acting as International Searching Authority, "International Search Report and Written Opinion," for PCT application No. PCT/EP2019,052904, dated Jun. 21, 2019.

* cited by examiner

ELECTRODE AND ELECTRODE MATERIAL COMPRISING SULFUR-LIMONENE POLYSULFIDE FOR LITHIUM-SULFUR BATTERIES

The present invention relates to an electrode material comprising at least one sulfur-limonene sulfide component or a composite of the sulfur-limonene sulfide component with a first conductive component; electrodes, in particular cathodes, containing the electrode material; half-cells, cells, and batteries containing the electrodes; and processes for obtaining the electrode material, the electrode, the half-cell, the cell, and the battery comprising electrode material and/or electrodes of the present invention.

Lithium-ion batteries (LIBs) are becoming more and more common in our daily life with the development of the global economy and improvement of lifestyle continue. Considering natural resources, environment and energy related problems, the next-generation lithium-based rechargeable batteries with higher energy density and specific energy, higher safety to human and nature, longer cycle life and lower cost have been viewed as more attractive energy storage system for the sharp growing demand of current market. However, the current commercial lithium-ion batteries based on Li-ion insertion chemistry cannot meet such market demand and are facing the bottleneck in terms of the limited specific capacities (below 250 mAh $g^{-1}$), and high toxicity and cost of Ni- and Co-based intercalation cathode materials.

Elemental sulfur with its theoretical capacity of 1675 mAh $g^{-1}$ in lithium-sulfur (Li—S) chemistry has become one of the most promising conversion cathode materials which potentially offer higher energy densities in future applications. In addition, sulfur is abundant, very cheap, and nontoxic when compared to Ni- and Co-based intercalation compounds.

For all of these reasons, sulfur-based electrodes are being investigated as a cost-effective, environmentally friendly, performance enhancing component of various batteries, such as Li- and Li-ion batteries. Batteries with other active metal ions participating in electrochemical reactions (e.g., with Na ions, K ions, Mg ions, and other metal ions) may also benefit from the use of high-capacity, sulfur-comprising electrodes.

However, realization of the full potential of sulfur-based cathodes in metal-ion batteries has been hindered by a number of significant challenges, including low electrical conductivity, low ionic conductivity and the physical instability of conventional sulfur-based cathodes. Sulfur and sulfur-containing compounds are highly electrically insulating. The ionic conductivity of lithium in sulfur and sulfur-compounds is also very small, which typically slows down the overall rate of the electrochemical reactions and leads to low power characteristics in Li—S cells. In addition, sulfur cathodes generate intermediate electrochemical reaction products (polysulfides, such as $Li_2S_n$) that are highly soluble in conventional organic electrolytes. This leads to sulfur cathode dissolution and re-deposition of electrically-insulating precipitates on the anode surface, preventing full reversibility of the electrochemical reaction.

To mitigate these problems carbon hosts or interlayers with sophisticated nano-architectures including tailored surface and/or pore characteristics were designed with the purpose of improving transport and suppressing polysulfide dissolution and the related shuttle effects. In order to more effectively anchor the polysulfide inside the electrode, both physical confinement and chemical binding were exploited using metal oxides, sulfides, nitrides or hydroxides. As far as the carbon admixture is concerned, various dopants such as nitrogen, boron or sulfur were employed, functional groups were introduced on the carbon surface or coatings were applied to it. As far as the electrolytes are concerned, selected additives and Li salts have been developed offering protective coatings on the S-based cathode or the Li metal anode; moreover, high concentration electrolytes have been employed, yet they are expensive and reduce polysulfide dissolution only partially. In very recent years, chemical impregnation of sulfur through strong covalent bond formation has been developed to synthesize sulfur rich polymers in order to enhance rate and cycling performance of S-based cathodes. In all these examples, either the electrochemical performance was not satisfactory or the materials were environmentally critical or expensive.

It is therefore the technical problem underlying the present invention to overcome the aforementioned disadvantages and in particular to provide an electrode and an electrode material for an electrode, that satisfies the need for long-term stable electrode and electrode material with a high specific capacity in combination with a high coulombic efficiency during operation. In particular, the material should be easy to make and all raw materials should be inexpensive.

The present invention solves its technical problem by the subject-matter of the independent claims.

In particular, the present invention solves its technical problem by providing an electrode, preferably for a lithium-sulfur battery, which comprises, in particular consists of, an electrode material comprising, in particular consisting of, at least one sulfur-limonene sulfide component or a composite of the sulfur-limonene sulfide component with a first conductive component.

In particular, the present invention solves its technical problem by providing an electrode material, preferably for a lithium-sulfur battery, comprising, in particular consisting of, at least one sulfur-limonene sulfide component or a composite of the sulfur-limonene sulfide component with a first conductive component.

Thus, the present invention provides in particular both an electrode and an electrode material each of them being characterized by the presence of at least one sulfur-limonene sulfide component or composite of the sulfur-limonene sulfide component with a first conductive component.

In particular, the electrode material comprising the at least one sulfur-limonene sulfide component or composite of the sulfur-limonene sulfide component with a first conductive component can be used directly as electrode or as electrode material, for instance on a suitable current collector, preferably cathode current collector. In a particularly preferred embodiment, the composite of the present invention may be used as an electrode itself. A preferred embodiment of the present invention relates to an electrode material, comprising at least one sulfur-limonene sulfide component or a composite thereof with the first conductive component which component or composite is applied on a current collector, in particular a cathode current collector, preferably a metal current collector.

The present invention also pertains to an electrode, preferably for a lithium sulfur battery, which comprises an electrode material comprising at least one sulfur-limonene sulfide component or a composite of the sulfur-limonene sulfide component with a first conductive component, wherein the electrode material is applied to a current collector, in particular a cathode current collector, preferably a metal current collector.

In a preferred embodiment, the at least one sulfur-limonene sulfide component is sulfur-limonene polysulfide (SLP).

Preferably, the present invention provides an electrode comprising, in particular consisting of, sulfur-limonene polysulfide (SLP) or a composite of the sulfur-limonene polysulfide (SLP) with a first conductive component.

Preferably, the present invention provides an electrode material comprising, in particular consisting of, sulfur-limonene polysulfide (SLP) or a composite of the sulfur-limonene polysulfide (SLP) with a first conductive component.

In the context of the present invention the term "sulfur-limonene polysulfide", also termed SLP, designates SLP, in particular a sulfur-limonene based polymer obtainable, in particular obtained, by reacting molten sulfur with limonene, in particular molten sulfur with D-limonene or its enantiomere, so as to obtain sulfur-limonene polysulfide. Preferably, the sulfur employed for obtaining SLP is elemental sulfur, preferably in form of cycloocta sulfur ($S_8$). Limonene, in particular D-limonene, employed for obtaining SLP can be extracted from natural fruits including orange, lemon, pomelo, citrus, etc.

In the context of the present invention, SLP is preferably obtainable by heating sulfur to a temperature sufficient to provide molten sulfur, adding limonene, in particular D-limonene, to the molten sulfur and heating the mixture of limonene and molten sulfur for a period of time sufficient, preferably 0.5 to 24 hours, to yield a single phase, wherein said single phase comprises SLP. In a preferred embodiment of the present invention, the term SLP also refers to SLP obtainable by heating sulfur to a temperature sufficient to provide molten sulfur, further heating the molten sulfur and then adding limonene, in particular D-limonene, to said molten and heated sulfur, keeping the limonene and molten sulfur for a period of time sufficient to yield a single phase, wherein said single phase comprises SLP.

Preferably, the SLP is obtainable by heating the sulfur or the mixture of sulfur and limonene to a temperature from 120 to 300° C., preferably 165 to 190° C., in particular 170 to 180° C., in particular 175° C. In said process any ratio between limonene and sulfur can be employed, preferably in a weight ratio of 1:(0.2 to 10), in particular in a ratio of (30 to 70):(70 to 30). Preferably, an equal mass of limonene is added to the molten and heated sulfur.

Without being bound by theory, heating of the sulfur to a temperature above 150° C., in particular above 170° C., activates the sulfur, in particular results in $S_8$ ring opening, and enables subsequent polymerization to form linear and polymeric sulfur chains of high-molecular weight, allowing the added limonene, particularly D-limonene, to be oxidized by the polymeric sulfur forming SLP, in particular SLP with long chains. However, in the context of the present invention, the term SLP also refers to SLP produced by other processes to obtain sulfur-limonene polysulfide. In the context of the present invention, SLP can, in a preferred embodiment, be SLP as disclosed in WO 2016/064615 A1.

Without being bound by theory, a first discharge process of an electrode material of the present invention comprising SLP in an electrolytic solvent comprising lithium ions (Li-ion) converts at least parts of the SLP, preferably comprising long S—S-chains, irreversibly and permanently into a lithium sulfur-limonene disulfide matrix and $Li_2S$ embedded in this matrix, in particular $Li_2S$ nanoparticles.

In the context of the present invention, the first discharge process to which an electrode material of the present invention comprising SLP or a composite of SLP with a first conductive component is subjected, in particular in an electrolytic solvent in the presence of Li-ions, is termed to be an activation process, results in the formation of a lithium sulfur-limonene disulfide matrix and $Li_2S$, in particular $Li_2S$ nanoparticles, contained in the matrix. In the following, the lithium sulfur-limonene disulfide matrix together with the embedded $Li_2S$ is termed to be a lithium sulfur-limonene disulfide structure.

During such activation process of the SLP used in the present invention, electroactive lithium sulfide ($Li_2S$), in particular $Li_2S$ nanoparticles, are generated which are embedded in the lithium sulfur-limonene disulfide matrix. During charging, this electroactive $Li_2S$ embedded in the lithium sulfur-limonene disulfide matrix and the lithium sulfur-limonene disulfide matrix itself are reversibly converted into sulfur, in particular $S_8$, preferably $S_8$ nanoparticles, and an elemental sulfur-limonene disulfide matrix, whereby the sulfur is embedded in the elemental sulfur-limonene disulfide matrix. In the following, the elemental sulfur-limonene disulfide matrix together with the embedded elemental sulfur is termed to be an elemental sulfur-limonene disulfide structure. In the following cycles of discharging and charging these conversions occur reversibly. As these nanoparticles are partially or entirely shielded from direct contact with the electrolyte, detrimental dissolution and shuttle effects are inhibited and a very stable cycling is achieved by the present invention.

In the context of the present invention the "lithium sulfur-limonene disulfide matrix" and the "elemental sulfur-limonene disulfide matrix" are collectively referred to as "polymeric sulfur-limonene disulfide matrix" or in short as "polymeric matrix".

In the context of the present invention the "lithium sulfur-limonene disulfide structure" and the "elemental sulfur-limonene disulfide structure" are collectively referred to as "polymeric sulfur-limonene disulfide structure" or in short as "polymeric structure".

In a preferred embodiment of the present invention, the polymeric structure, in particular matrix, is a non-porous structure, in particular matrix.

The present invention, thus, also relates both to an electrode and an electrode material, preferably for a lithium sulfur battery, comprising at least one sulfur-limonene sulfide component or a composite of the sulfur-limonene sulfide component with a first conductive component, wherein the sulfur-limonene sulfide component is a polymeric sulfur-limonene disulfide structure, which is preferably obtainable, in particular obtained, from electrode material of the present invention, namely electrode material comprising SLP or a composite of SLP with a first conductive component, by an activation process, in particular a first discharge process, in particular in an electrolytic solvent comprising Li-ions, and, preferably, by a subsequent charging process.

Said polymeric sulfur-limonene disulfide structure may be present in the electrode material of the present invention, dependent upon the charge and discharge stage, in form of a lithium sulfur-limonene disulfide structure or in form of an elemental sulfur-limonene disulfide structure which electrode materials can be in an electrolytic solvent comprising Li-ions. The two forms are reversibly transformed into each other by charge and discharge processes.

In a preferred embodiment, the lithium sulfur-limonene disulfide structure contains $Li_2S$, in particular $Li_2S$ nanoparticles, embedded in the polymeric lithium sulfur-limonene disulfide matrix. The lithium sulfur-limonene disulfide structure, which contains $Li_2S$ is also termed to be in short a "lithiated structure".

In another preferred embodiment, the elemental sulfur-limonene disulfide structure contains elemental sulfur, in particular $S_8$, in particular $S_8$ nanoparticles, embedded in the polymeric elemental sulfur-limonene disulfide matrix. The elemental sulfur-limonene disulfide structure, which contains elemental sulfur, is also termed to be in short a "delithiated structure".

In a preferred embodiment of the present invention, the polymeric sulfur-limonene disulfide structure, in particular matrix, comprises SLP.

In a further preferred embodiment the lithium sulfur-limonene disulfide structure additionally comprises SLP.

In another preferred embodiment the elemental sulfur-limonene disulfide structure additionally comprises SLP.

Preferably, both of the polymeric sulfur-limonene disulfide structures according to the present invention are converted into each other by charge and discharge processes in a battery comprising an electrode material, in particular an electrode, of the present invention, preferably in the presence of an electrolytic solvent and Li-ions.

The lithium sulfur-limonene disulfide structure is obtainable by a first discharge process of sulfur-limonene polysulfide (SLP) in an electrolytic solvent comprising Li-ions or by a discharge process of an elemental sulfur-limonene disulfide structure in an electrolytic solvent comprising Li-ions.

The elemental sulfur-limonene disulfide structure is obtainable by a charge process of a lithium sulfur-limonene disulfide structure in an electrolytic solvent comprising Li-ions.

In a preferred embodiment of the present invention, the at least one sulfur-limonene sulfide component is a polymeric sulfur-limonene disulfide structure, in particular in form of a lithiated or delithiated structure, optionally comprising SLP.

In a preferred embodiment, the present invention relates to an electrode comprising electrode material, preferable for a lithium-sulfur battery, comprising a polymeric sulfur-limonene disulfide structure, in particular in form of a lithiated or delithiated structure, or a composite of the polymeric sulfur-limonene disulfide structure with a first conductive component. In a preferred embodiment the polymeric sulfur-limonene disulfide structure, in particular in form of a lithiated or delithiated structure, additionally comprises SLP.

In a preferred embodiment, the present invention relates to an electrode material, preferable for a lithium-sulfur battery, comprising a polymeric sulfur-limonene disulfide structure, in particular in form of a lithiated or delithiated structure, or a composite of the polymeric sulfur-limonene disulfide structure with a first conductive component. In a preferred embodiment the polymeric sulfur-limonene disulfide structure, in particular in form of a lithiated or delithiated structure, additionally comprises SLP.

The electrode and the electrode material provided by the present invention surprisingly provides an enhanced battery performance and can be produced in a simple and inexpensive process. Thus, the present invention provides an improved electrode material, provides improved electrodes, provides improved galvanic half-cells and galvanic cells containing these electrodes, provides improved batteries containing such electrode material and/or such electrode of the present invention and provides process to produce the electrode materials, the electrodes, the half-cells, the cells and the batteries.

The presently provided electrode and the electrode material meet both economic and ecological criteria and combine these with an excellent electrode chemical performance. The presently provided electrode material and electrode are particularly stable and show no or almost no degradation even within 200 to 300 cycles at a current high enough to charge/discharge the total capacity within two hours (C/2, typically used for Li—S batteries).

In particular, the present electrode material, in particular the at least one sulfur-limonene component, in particular SLP or a composite thereof with the first conductive component or the polymeric sulfur-limonene disulfide structure or the composite thereof with a first conductive component can advantageously be used as an active material for an electrode, in particular a cathode, in a half-cell, a cell or a battery.

The present electrode and the electrode material can be prepared on a large scale basis based on abundant and inexpensive and environmentally friendly raw materials, namely sulfur and limonene, in particular from orange and lemon peels. The present electrode material is advantageously insofar, as it shows hardly any or no detrimental dissolution and shuttle effects due to self-protection and confinement of lithium sulfide and sulfur in the polymeric matrix. The presently provided electrode material can advantageously be used to prepare sulfur-limonene based electrodes, exhibiting good electrochemical performances. Preferably, electrodes of the present invention are characterized by particularly high discharge capacities, in particular at least 800 mAh $g^{-1}$, preferably at least 950 mAh $g^{-1}$, preferably 1000 mAh $g^{-1}$ or more at a C/2 charging rate, and/or a very high cycle stability, in particular having in preferred embodiments a fading rate as low as 0.008% per cycle during 300 cycles.

In a preferred embodiment of the present invention, an electrode and an electrode material are provided, wherein the electrode material is present in form of a composite of the sulfur-limonene sulfide component, in particular SLP, or the polymeric structure, with a first conductive component. In particular, SLP offers excellent properties as electroactive material in the combination with various first conductive components, in particular, carbon phases including a wide range of commercial available carbon phases.

In a preferred embodiment, the present invention provides an electrode and an electrode material of the present invention, wherein the first conductive component is conductive carbon, porous metal oxide, porous metal sulfide, porous metal hydroxides, conductive polymer or a combination thereof.

In a preferred embodiment, the present invention provides an electrode and an electrode material of the present invention, wherein the conductive carbon is selected from the group consisting of porous carbon, porous carbon spheres, carbon films, carbon black, pure black, carbon nanotubes, graphite, in particular graphene, carbon nanofibers, carbon nanospheres, porous carbon hosts, porous carbon sheets, graphene sheets, carbonized polymer sheets, CNT papers, carbonized cellulose film, carbon paper and carbonized porous cellulose paper.

Preferably, the first conductive component is a free-standing first conductive component, namely porous carbon sheets, carbonized polymer sheets, CNT papers, carbonized cellulose films, carbon paper or carbonized porous cellulose paper or graphene sheets.

In a preferred embodiment, the present invention provides an electrode and an electrode material of the present invention, wherein the carbonized porous cellulose paper is generated by carbonization of porous cellulose paper, preferably at temperatures from 400 to 800° C., preferably 550 to 650°

C., preferably for a time from 1 to 8 hours, preferably 2 to 6 hours, preferably 3 to 5 hours, most preferably at 600° C. for 4 hours. Preferably, the heating rate is 0.5 to 2° C./min, preferably 1° C./min.

In a preferred embodiment the electrode of the present invention is a free-standing SLP electrode, preferably comprising a composite of SLP or of a polymeric structure with conductive carbon.

The present invention also provides in a preferred embodiment an electrode, preferably for a lithium-sulfur battery, which is a free-standing SLP-electrode consisting of a composite of the sulfur-limonene sulfide component, preferably SLP, with the first conductive component.

Preferably, the present invention provides a free-standing SLP electrode consisting of a composite of the sulfur-limonene sulfide component, preferably SLP, with the first conductive component, wherein the first conductive component is a free-standing first conductive component, in particular porous carbon sheets, graphene sheets, carbonized polymer sheet, CNT papers, carbonized cellulose films, carbonized paper or carbonized porous cellulose paper.

The present invention also pertains to a free-standing sulfur-limonene polysulfide-electrode, preferably for a lithium-sulfur battery, consisting of a sulfur-limonene sulfide component, preferably SLP, with a first conductive component, wherein the first conductive component is a free-standing first conductive component, in particular porous carbon sheets, graphene sheets, carbonized polymer sheet, CNT papers, carbonized cellulose films, carbonized paper or carbonized porous cellulose paper.

In a preferred embodiment, the present invention provides an electrode and an electrode material of the present invention, wherein the composite of SLP with the first conductive component has a sulfur-limonene polysulfide (SLP) content by weight from 50% to 95%, preferably from 65% to 80%, more preferably from 70% to 75%, most preferably from 72% to 73% (each based on overall weight of the composite of SLP with the first conductive component), wherein preferably the remainder of 100% adds up with the first conductive coating.

In a further preferred embodiment of the present invention an electrode and an electrode material are provided, wherein the composite of the polymeric sulfur-limonene disulfide structure with the first conductive component has a content of the polymeric sulfur-limonene disulfide structure by weight from 50% to 95%, preferably from 65% to 80%, more preferably from 70% to 75%, most preferably from 72% to 73% (each based on overall weight of the composite of the polymeric sulfur-limonene disulfide structure with the first conductive component), wherein preferably the remainder of 100% adds up with the first conductive coating.

In a preferred embodiment of the present invention, the electrode or electrode material comprises at least one binder.

In a preferred embodiment the present invention provides an electrode and an electrode material of the present invention, wherein the binder is selected from the group comprising carboxymethyl cellulose (CMC), sodium cellulose, polyacrylic acid, polyvinylidene fluoride, sodium alginate or SBR (styrene-butadiene-rubber), preferably is CMC.

In a preferred embodiment of the present invention the present electrode does not comprise a binder or a second conductive component. In a preferred embodiment of the present invention the electrode of the present invention consists of at least one sulfur-limonene sulfide component or composite of the sulfur-limonene component with a first conductive component.

In a furthermore preferred embodiment of the present invention the present electrode material does not comprise a binder and/or second conductive component. In a preferred embodiment of the present invention the electrode material of the present invention consists of at least one sulfur-limonene sulfide component or composite of the sulfur-limonene component with a first conductive component.

In a preferred embodiment, the present invention provides an electrode or an electrode material of the present invention, wherein the electrode or electrode material has a sulfur-limonene polysulfide (SLP) content by weight from 1 to 99%, preferably 10 to 95%, preferably 30 to 90%, preferably 50% to 85%, preferably 65% to 80%, more preferably 70% to 75%, most preferably 72% to 73% (each based on overall weight of the electrode or electrode material), wherein preferably the remainder of 100% adds up with the first conductive component, a binder, a second conductive coating or a combination thereof, whichever is present.

In a preferred embodiment, the present invention provides an electrode material or an electrode of the present invention, wherein the electrode or electrode material has a content of the polymeric sulfur-limonene disulfide structure by weight 1 to 99%, preferably 10 to 95%, preferably 30 to 90%, preferably 50% to 85%, preferably 65% to 80%, more preferably 70% to 75%, most preferably 72% to 73% (each based on overall weight of the electrode or electrode material), wherein preferably the remainder of 100% adds up with SLP, the first conductive component, a binder, a second conductive coating or a combination thereof, whichever is present.

In a preferred embodiment, the present invention provides an electrode and an electrode material of the present invention, wherein the electrode or electrode material comprises 1 to 99%, preferably 10 to 95%, preferably 30 to 90%, preferably 50% to 85%, preferably 65% to 80%, more preferably 70% to 75%, most preferably 72% to 73% of the composite of SLP with the first conductive component (each based on overall weight of the electrode and electrode material), wherein preferably the remainder of 100% adds up with a second conductive coating or/and a binder.

In a further preferred embodiment of the present invention there is provided an electrode and an electrode material, wherein the electrode material or the electrode comprises 1 to 99%, preferably 10 to 95%, preferably 30 to 90%, preferably 50% to 85%, preferably 65% to 80%, more preferably 70% to 75%, most preferably 72% to 73% of the composite of the polymeric sulfur-limonene disulfide structure with the first conductive component (each based on overall weight of the electrode and electrode material), wherein preferably the remainder of 100% adds up with a second conductive coating or/and a binder.

In a preferred embodiment, the present invention provides an electrode material of the present invention, comprising a) electrode material comprising at least one sulfur-limonene sulfide component or a composite of the sulfur-limonene sulfide component with a first conductive component, b) at least one second conductive component and c) at least one binder, preferably in a weight ratio a):b):c) of (50 to 95):(1 to 30):(1 to 20), preferably 85:5:10.

In a preferred embodiment of the invention, the at least one second conductive component is carbon black or graphite.

In a preferred embodiment of the present invention, an electrode, preferably for a lithium-sulfur battery, is provided, that comprises an electrode material according to the present invention.

In a preferred embodiment the present invention also provides an electrochemical half-cell and an electrochemical cell, which comprise an electrode material according to the present invention or an electrode according to the present invention.

In particular, the present invention provides an electrochemical half-cell or cell, comprising an electrode, wherein the electrode comprises an electrode material comprising at least on sulfur-limonene sulfide component or a composite of the sulfur-limonene sulfide component with a first conductive component.

In a preferred embodiment, the half-cell or the cell of the present invention comprises at least one salt, preferably a lithium salt, in an electrolytic solvent.

In a preferred embodiment of the invention, the concentration of the lithium salt in the electrolytic solvent is from 0.1 to 10 M (M: molar, mole per liter), preferably from 0.15 to 5 M, more preferably from 0.25 to 1 M, and most preferably 0.5 M.

In a preferred embodiment of the invention there is provided a half-cell or cell of the present invention, wherein the lithium salt is selected from the group comprising lithium bis(trifluoromethanesulfonyl)imide (LiTFSI), lithium bis(fluorosulfonyl)imide, lithium hexafluorophosphate, lithium tetrafluoroborate, lithium perchlorate, lithium hexafluoroarsenate, lithium bis(oxalate)borate, lithium difluoro(oxalato)borate or an combination thereof.

In a preferred embodiment of the invention there is provided a half-cell or cell of the present invention, wherein the electrolytic solvent is a non-aqueous solvent, preferably an aprotic non-aqueous solvent, preferably selected from the group comprising dimethoxyethane(DME):1,3-dioxolane (preferably 1:1, v:v), propylene carbonate (PC), ethylene carbonate (EC), dimethyl carbonate (DMC), diethyl carbonate (DEC), ethyl methyl carbonate (EMC), tetrahydrofuran (THF), 1,2-dimethoxyethane (DME), 1,3-dioxalane (DIOX), 2-methyltetrahydrofuran (2Me-THF), vinylene carbonate (VC), N-methylpyrrolidone (NMP), acetonitrile, and/or ethyl acetate, or a combination thereof.

In a preferred embodiment the present invention provides a half-cell or cell of the present invention, wherein the electrolyte comprises $LiNO_3$ as additive lithium salt.

In a preferred embodiment of the invention, the at least one lithium salt is present in the electrolytic solvent in an amount of 0.1 to 2 wt %, preferably 0.5 to 1.5 wt % (based on overall weight of the solution).

In a preferred embodiment of the present invention, a battery, preferably a lithium-sulfur battery, is provided, which comprises at least one electrode material according to the present invention or at least one electrode according to the present invention or at least one electrochemical half-cell or cell according to the present invention.

In a preferred embodiment the present invention provides a battery comprising an electrode material or electrode of the present invention, further comprising at least one electrode, preferably anode, at least one electrolytic solvent and at least one separator, preferably a microporous membrane. Preferably, the battery also comprises at least one salt, preferably lithium salt.

Preferably, the anode is a lithium anode, silicone anode or a silicone graphite composite anode. It can also be a graphite metal or metal alloy composite anode.

In a preferred embodiment, the present invention also provides a process for preparing a composite of a sulfur-limonene sulfide component with a first conductive component, comprising the following process steps: a) providing a sulfur-limonene sulfide component and a first conductive component, b) contacting the sulfur-limonene sulfide component with the first conductive component at an elevated temperature, preferably from 100 to 200° C., preferably 120 to 180° C., preferably for 3 to 5 hours, and c) obtaining the composite of the sulfur-limonene sulfide component with the first conductive component.

In a preferred embodiment of the process of the present invention, the sulfur-limonene sulfide component is sulfur-limonene polysulfide (SLP).

In a preferred embodiment the present invention provides a process for preparing an electrode material, preferably a lithium electrode material, comprising the following steps:
ax) providing a sulfur-limonene sulfide component, preferably sulfur-limonene polysulfide (SLP), or a composite of the sulfur-limonene sulfide component, preferably of the sulfur-limonene polysulfide (SLP), with a first conductive component, and at least one of a second conductive material and a binder,
bx) contacting the sulfur-limonene sulfide component, preferably the sulfur-limonene polysulfide (SLP), or the composite of the sulfur-limonene sulfide component, preferably the sulfur-limonene polysulfide (SLP), with the first conductive component with at least one of the second conductive material and the binder, preferably in a weight ratio of (50 to 95):(1 to 30):(1 to 20), preferably 85:5:10, and
cx) obtaining the electrode material.

The electrode material prepared, according to process steps ax), bx) and cx), can be used as an electrode itself or be applied to a current collector forming together with the electrode material an electrode.

In a preferred embodiment the present invention provides a process for preparing a cell or a battery, preferably a lithium-sulfur battery, comprising the following process steps:
x) providing an electrode according to the present invention, a second electrode, preferably an anode, preferably a lithium electrode, a separator, and, optionally, an electrolytic solvent and/or a salt, preferably a lithium salt, and
y) assembling them to provide a battery.

In a preferred embodiment of the invention, subsequent to step y) the cell or battery is subjected to an activation process, in particular a first discharging step in an electrolytic solvent comprising Li-ions.

The present invention also relates to a device, in particular an electrical device, comprising a battery of the present invention, in particular the battery being connected functionally and/or structurally to the device.

In a preferred embodiment the present invention also provides a use of a sulfur-limonene sulfide component, in particular SLP, or a composite of a sulfur-limonene sulfide component, in particular SLP, with a first conductive component, in particular conductive carbon, in particular SLP, as an active electrode material, in particular for a cathode.

The present invention also relates to the above-mentioned use, wherein the sulfur-limonene sulfide component is sulfur-limonene polysulfide (SLP) or a polymeric sulfur-limonene disulfide structure.

In the context of the present invention an "electrode" is an electrical conductor used in contact with a non-metallic part of the circuit, in particular an electrolytic solvent.

In the context of the present invention, the electrode material, in particular the composite of the sulfur-limonene sulfide component with the first conductive component may be used as an electrode itself. In a further preferred embodiment the electrode material of the present invention may be applied to a current collector.

In the context of the present invention, the term "current collector" refers to a substrate for an electrode material able to conduct electrons, for instance a metal substrate, in particular a metal foil.

In the context of the present invention the term "electrolyte" refers to ions, for instance lithium-ions, in particular at least one salt, in particular lithium salt, in an electrolytic solvent.

In the context of the present invention, the "cathode" is the electrode, in particular positive electrode, at which electrons enter the cell and reduction occurs (electron donor) while the anode negative electrode, electron acceptor) is the electrode at which electrons leave the cell and oxidation occurs, each electrode may become either the anode or the cathode depending on the direction of the current flow. The present electrode and electrode material can preferably be used as a cathode in the discharge phase or anode in the charging phase of a rechargeable battery.

In the context of the present invention, the term "first conductive component" refers to a first electron conductive component, which is able to conduct electrons and to form a composite with at least one sulfur-limonene sulfide component.

In the context of the present invention the term "second conductive component" refers to an electron conductive component, which is able to conduct electrons and to be mixed with an electrode material of the present invention.

In the context of the present invention, the term "composite" refers to a composite material made from two or more components with significantly different physical and/or chemical properties that when combined in a composite has characteristics different from the individual components and wherein, preferably, the individual components remain separate and distinctive in the composite and which, preferably, cannot be separated anymore from each other without destroying the original characterization, in particular physical and chemical properties, of the individual components.

In the context of the present invention, the term "battery" is understood to mean a primary as well as a secondary battery, for example, an ion-sulfur battery, preferably a lithium-sulfur battery. A primary battery can be a non-rechargeable battery, and a secondary battery can be a rechargeable battery. In the preferred embodiment the rechargeable battery may be a Li-based, a Na-based, K-based, a Ca-based or an Mg-based rechargeable battery.

In a preferred embodiment of the present invention, the term "ion" is understood to mean an ion for sulfur batteries, such as, for example, lithium, zinc and sodium.

In the context of the present invention, the term "a" is meant to include the meaning of "one" or "one or more"

In the context of the present invention, the term "comprising" preferably has the meaning of "containing" or "including" meaning that the composition in question at least comprises the specifically identified component without excluding the presence of further components. However, in a preferred embodiment the term comprising is also understood to have the meaning of "consisting essentially of" and in a most preferred embodiment of "consisting". The term "consisting essentially of" excludes the presence of substantial amounts of further components except the specifically identified component of the composition. The term "consisting" excludes the presence of any further compound, no matter in which quantity in the composition identified.

In the context of the present invention, the term "comprising essentially" preferably has the meaning that the specifically identified component is the component with the highest proportion in the composition in question compared to the components present in the composition in question. However, in a preferred embodiment the term "comprising essentially" means that the composition in question comprises at least 50% by weight, even more preferably at least 51% by weight of the specifically identified component.

In the context of the present invention, the term "at least one" preferably has the meaning that one component or more than one components, for example two, three or more components are present.

In the present teaching, reference to percent (%) is a reference to weight-%, unless otherwise specified. In the context of the present invention, all amounts, in particular relative amounts of components of a composition, do not exceed 100%, preferably add up to 100% based of the overall weight of the composition, as indicated.

In preferred embodiments, the present invention further pertains to following aspects.

Aspect 1: Electrode, preferably for a lithium-sulfur battery, which comprises an electrode material comprising at least one sulfur-limonene sulfide component or a composite of the sulfur-limonene sulfide component with a first conductive component.

Aspect 2: The electrode according to aspect 1, wherein the at least one sulfur-limonene sulfide component is sulfur-limonene polysulfide (SLP) or a polymeric sulfur-limonene disulfide structure.

Aspect 3: The electrode according to aspect 2, wherein the polymeric sulfur-limonene disulfide structure is a lithium-sulfur-limonene disulfide structure or an elemental sulfur-limonene disulfide structure.

Aspect 4: The electrode according to any one of the preceding aspects, wherein the composite of SLP with the first conductive component has a sulfur-limonene polysulfide (SLP) content by weight from 50 to 95%, preferably from 65 to 80%, more preferably from 70 to 75%, most preferably from 72 to 73% (each based on overall weight of the composite of the SLP with the first conductive component).

Aspect 5: The electrode according to any one of the preceding aspects, wherein the composite of the polymeric sulfur-limonene sulfide structure with the first conductive component has a content of the polymeric sulfur limonene disulfide structure by weight from 50 to 95%, preferably from 65 to 80%, more preferably from 70 to 75%, most preferably from 72 to 73% (each based on overall weight of the composite of the polymeric sulfur-limonene sulfide structure with the first conductive component).

Aspect 6: The electrode according to any one of the preceding aspects, wherein the first conductive component is conductive carbon, porous metal oxide, porous metal sulfide, porous metal hydroxides, conductive polymer or a combination thereof.

Aspect 7: The electrode according to any one of the preceding aspects, wherein the electrode material comprises at least one binder, at least one second conductive component or both.

Aspect 8: The electrode according to aspect 7, comprising an electrode material as characterized in any one of the preceding aspects 1 to 7, at least one second conductive component and at least one binder, preferably in a weight ratio of (80 to 90):(1 to 10):(5 to 15), preferably 85:5:10.

Aspect 9: The electrode according to any one of aspects 1 to 8, which is a free standing electrode consisting of a composite of the sulfur-limonene sulfide component, preferably SLP, with the first conductive component.

Aspect 10: Electrode material, preferably for a lithium-sulfur battery, comprising at least one sulfur-limonene sulfide component or a composite of the sulfur-limonene sulfide component with a first conductive component.

Aspect 11: An electrochemical half-cell or cell comprising an electrode according to any one of aspects 1 to 9 or an electrode material according to aspect 10.

Aspect 12: The half-cell or cell according to aspect 11, which comprises at least one lithium salt in an electrolytic solvent, optionally together with $LiNO_3$.

Aspect 13: The half-cell or cell according to aspect 12, wherein the concentration of the lithium salt in the electrolytic solvent is from 0.1 to 10 M, preferably from 0.15 to 5 M, more preferably from 0.25 to 1 M, and most preferably 0.5 M.

Aspect 14: Battery, preferably a lithium-sulfur battery, comprising at least one electrode according to any one of the aspects 1 to 9 or at least one electrode material according to aspect 10 or at least one electrochemical half-cell or cell according to any one of the aspects 11 to 13.

Aspect 15: A process for preparing a composite of a sulfur-limonene polysulfide (SLP) with a first conductive component, comprising the following process steps:
a) providing a sulfur-limonene polysulfide (SLP) and a first conductive component,
b) contacting the sulfur-limonene polysulfide (SLP) with the first conductive component at an elevated temperature, preferably from 100 to 200° C., preferably 120 to 180° C., preferably for 3 to 5 hours, and
c) obtaining the composite of the sulfur-limonene polysulfide (SLP) with the first conductive component.

Aspect 16: A process for preparing an electrode material, preferably a lithium electrode material, comprising the following steps:
ax) providing a sulfur-limonene sulfide component, preferably sulfur-limonene polysulfide (SLP), or a composite of the sulfur-limonene sulfide component, preferably of the sulfur-limonene polysulfide (SLP), with a first conductive component, and at least one of a second conductive material and a binder,
bx) contacting the sulfur-limonene sulfide component, preferably the sulfur-limonene polysulfide (SLP), or the composite of the sulfur-limonene sulfide component, preferably the sulfur-limonene polysulfide (SLP), with the first conductive component with at least one of the second conductive material and the binder, preferably in a weight ratio of (80 to 90):(1 to 10):(5 to 15), preferably 85:5:10, and
cx) obtaining the electrode material.

Aspect 17: A process for preparing a battery, preferably a lithium-sulfur battery, comprising the following process steps:
x) providing an electrode according to any one of aspects 1 to 9, a second electrode, preferably a lithium electrode, a separator, and, optionally at least one additive selected from the group consisting of an electrolytic solvent, a salt, preferably a lithium salt, and an electrolyte, and
y) assembling them to provide a battery.

Aspect 18: The process according to aspect 17, wherein subsequent to step y) the battery is subjected to an activation process.

Aspect 19: A device containing a battery according to aspect 14.

Aspect 20: Use of a sulfur-limonene sulfide component or a composite of a sulfur-limonene sulfide component with a first conductive component as an active electrode material, in particular for a cathode.

Further preferred embodiments are the subject-matter of the dependent claims.

The present invention is further explained by way of the following examples and the accompanying figures.

The Figures show:

FIG. 1 Chemical synthesis of sulfur-limonene polysulfide (SLP).

Figure 2A:
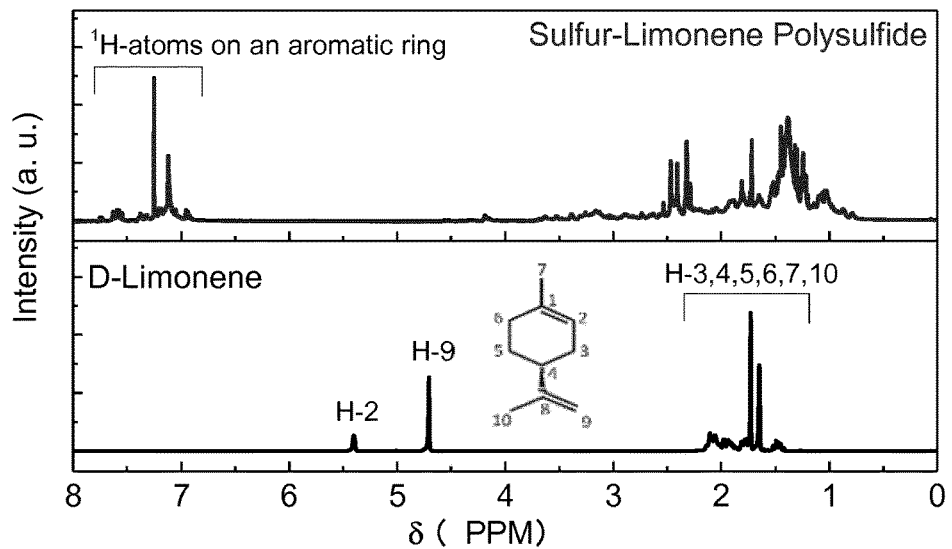

FIG. 2a The $^1H$ NMR spectra of D-limonene and sulfur-limonene polysulfide (SLP).

Figure 2B:
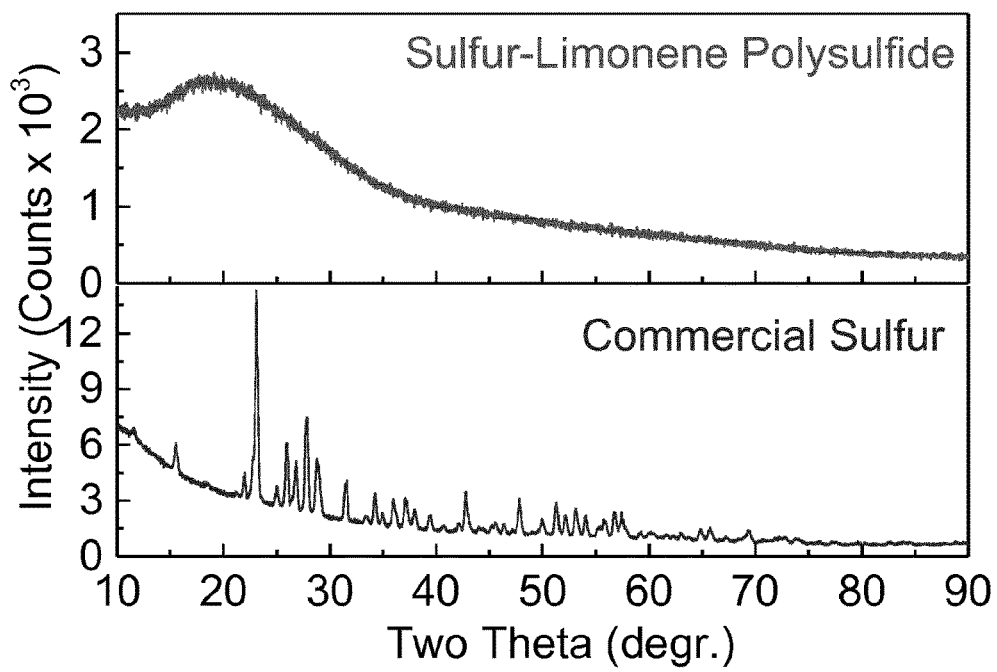

FIG. 2b The X-ray diffraction patterns of commercial sulfur powder and sulfur-limonene polysulfide (SLP).

Figure 3:
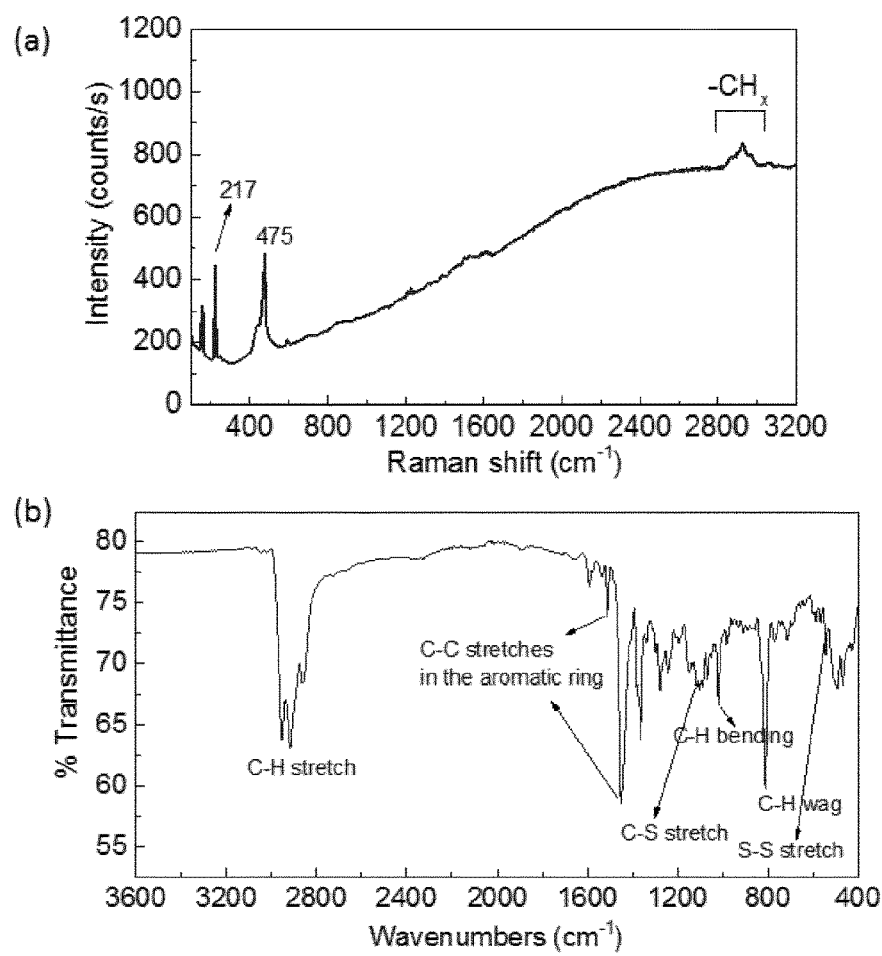

FIG. 3 Raman spectrum (a) and IR spectrum (b) of produced sulfur-limonene polysulfide (SLP).

Figure 4:
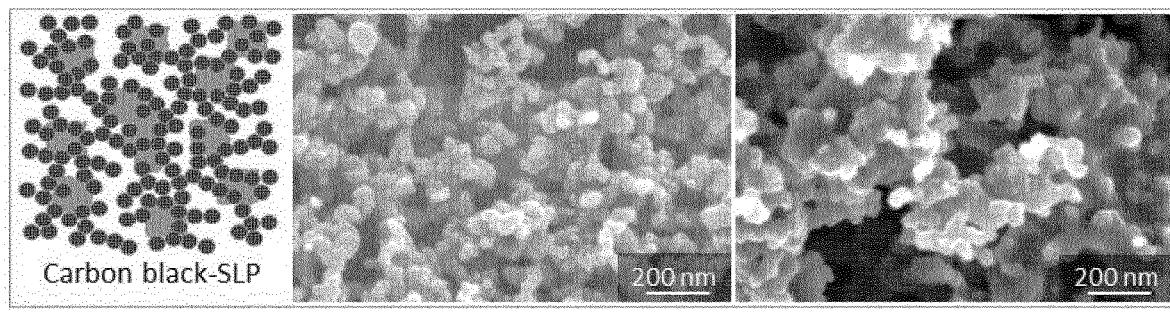

FIG. 4 Preparation of a composite of the sulfur-limonene polysulfide (SLP) with carbon black as first conductive component.

Figure 5:
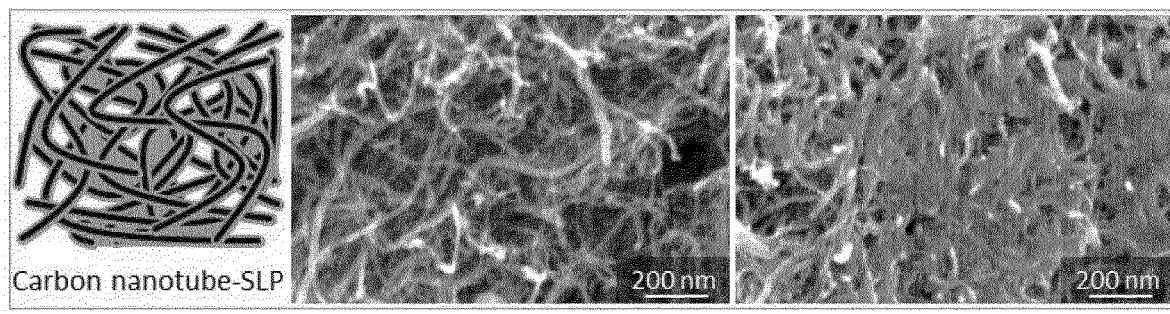

FIG. 5 Preparation of a composite of the sulfur-limonene polysulfide (SLP) with carbon nanotube as first conductive component.

Figure 6A:
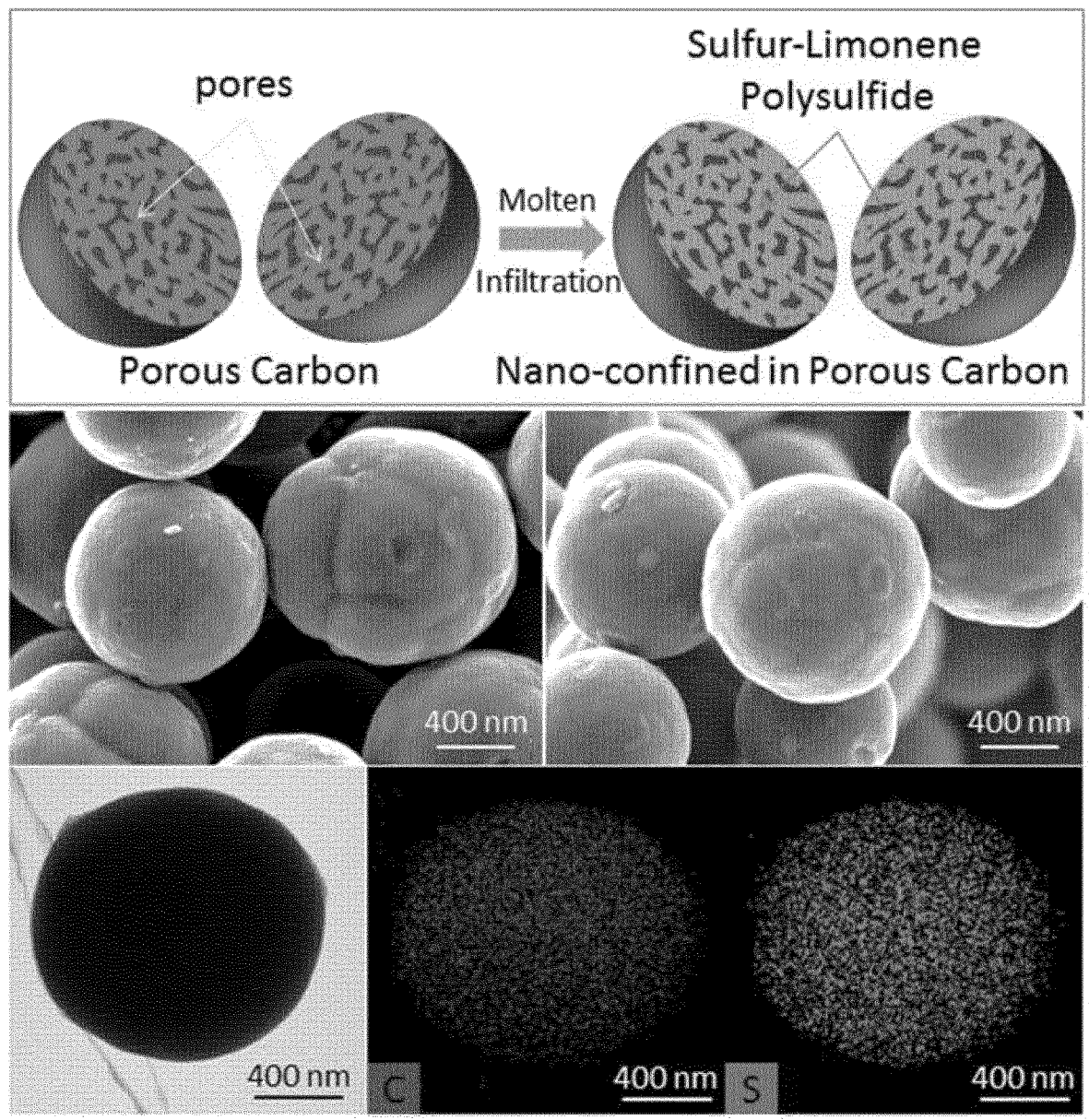

FIG. 6a Preparation of a composite of the sulfur-limonene polysulfide (SLP) with porous carbon as first conductive component by melt infiltration to obtain SLP which is nano-confined in the porous carbon.

Figure 6B:
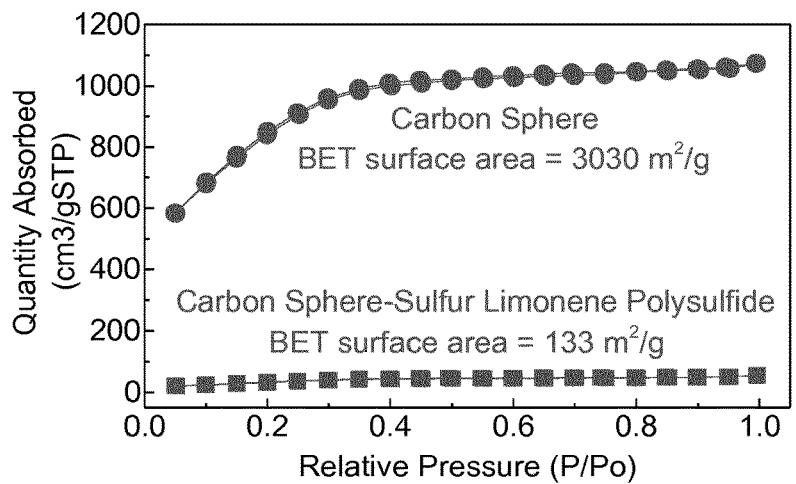

FIG. 6b BET surface area decrease after successful infiltration of SLP within CS.

Figure 7:
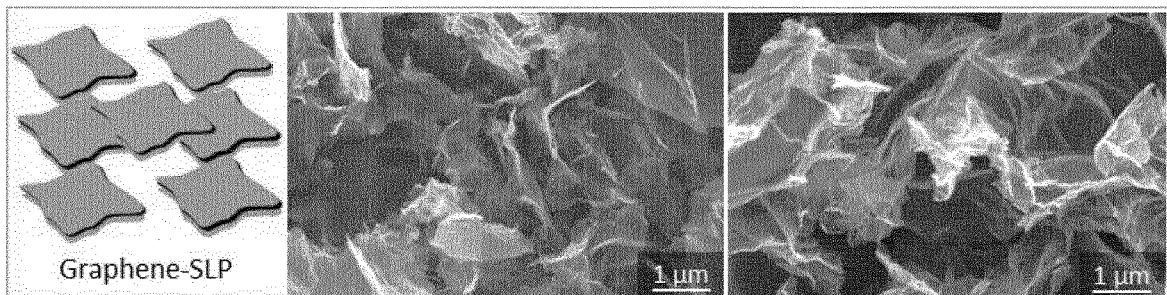

FIG. 7 Preparation of a composite of the sulfur-limonene polysulfide (SLP) with graphene as first conductive component.

Figure 8:
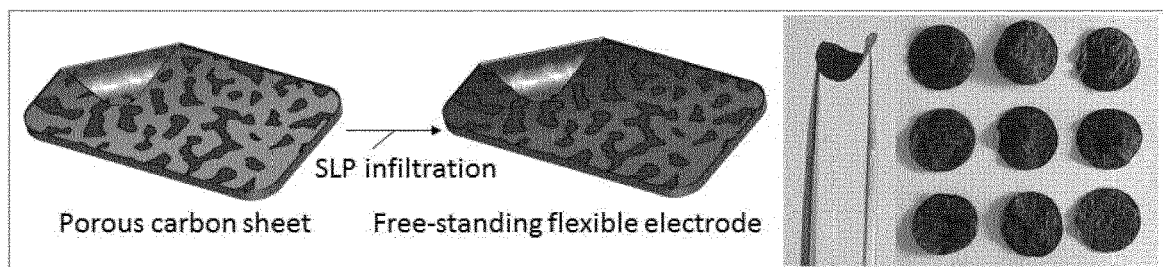

FIG. 8 Preparation of a composite of the sulfur-limonene polysulfide (SLP) with porous carbon sheets as first conductive component by melt-infiltration to form a free-standing flexible carbon paper-SLP electrode.

Figure 9:
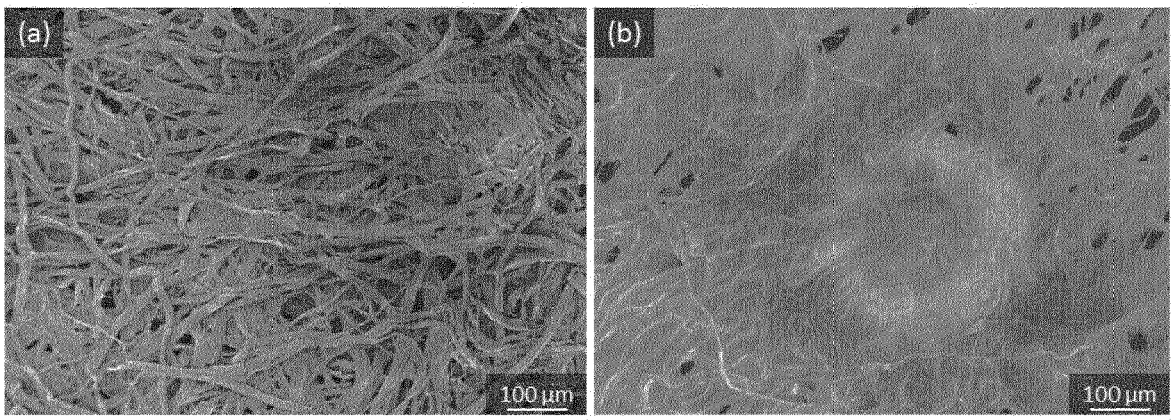

FIG. 9 SEM images of (a) carbonized cellulose film and (b) carbonized cellulose film with loading of sulfur-limonene polysulfide (SLP).

Figure 10:
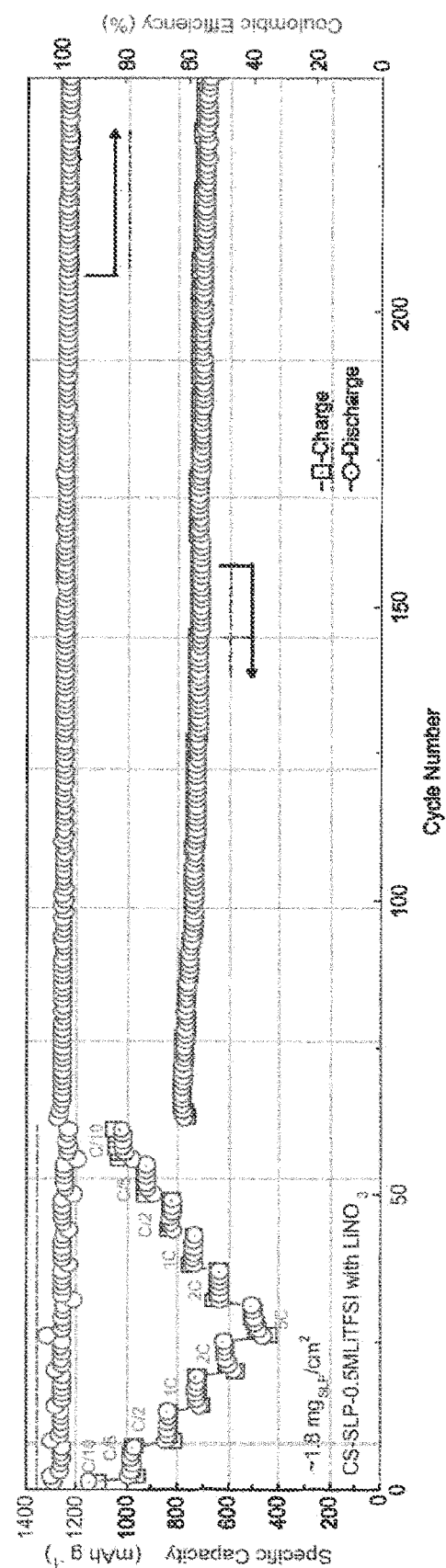

FIG. 10 Electrochemical performance of Li—S batteries based on sulfur-limonene polysulfide (SLP) electrodes.

Figure 11:
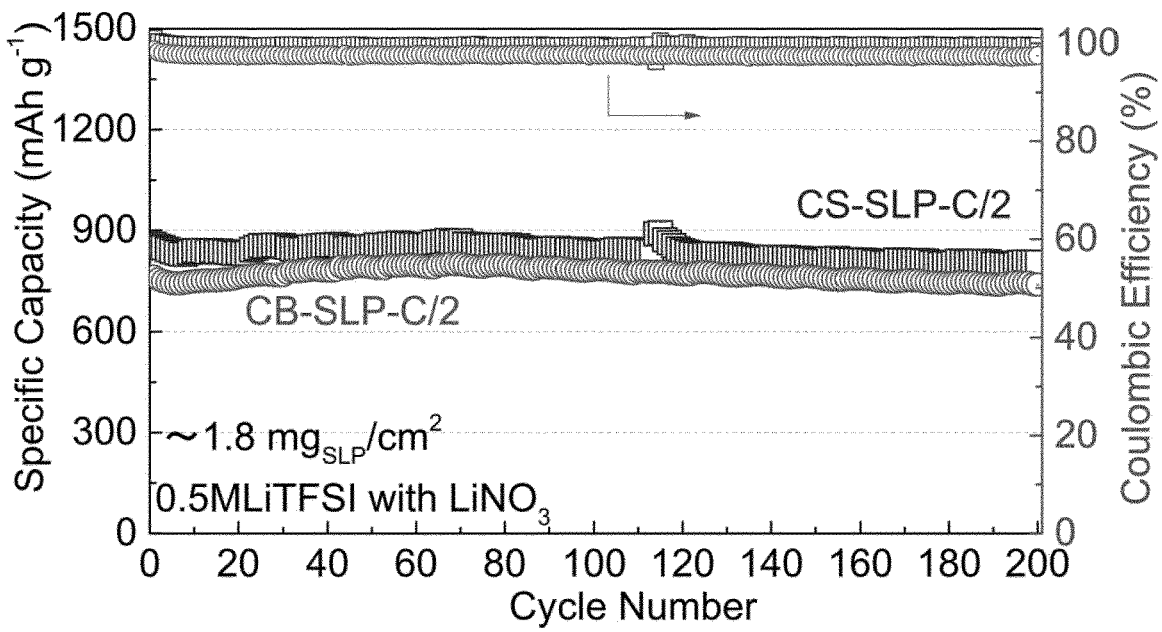

FIG. 11 Electrochemical performance of Li—S batteries based on sulfur-limonene polysulfide (SLP) electrodes.

Figure 12:
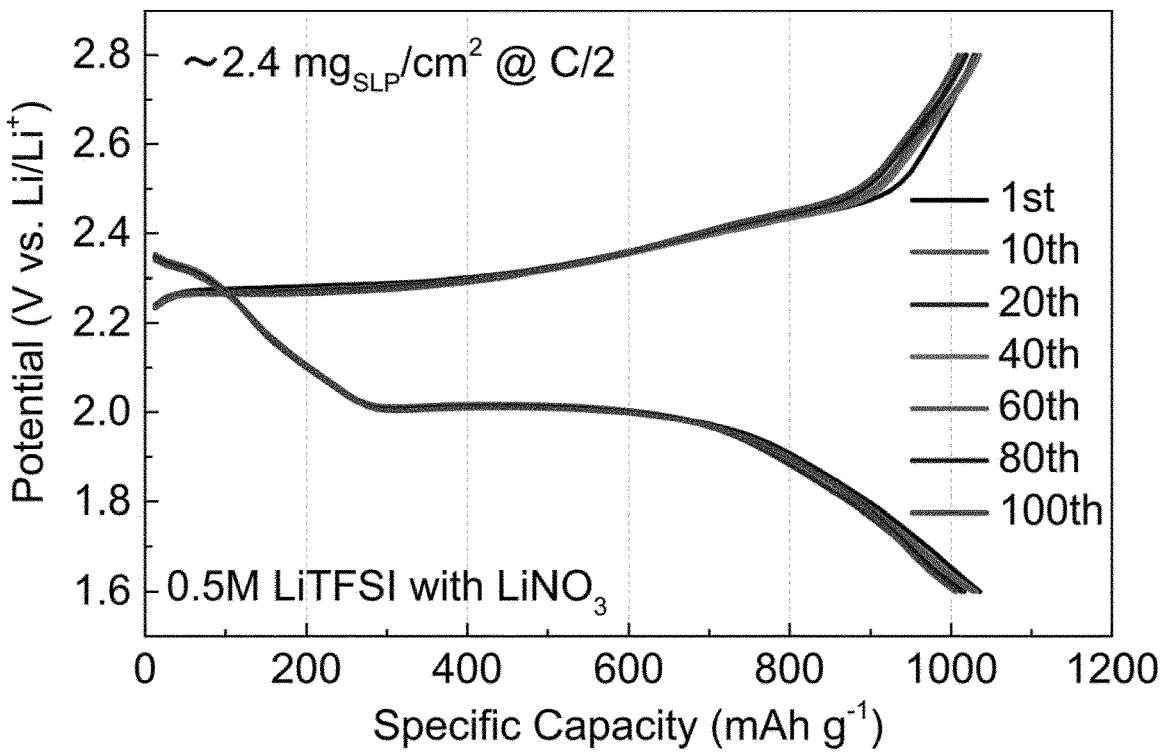

FIG. 12 The change of discharge/charge voltage profiles of a carbon paper-based sulfur-limonene polysulfide (SLP) cathode at a rate of C/2 over 100 cycles.

Figure 13:
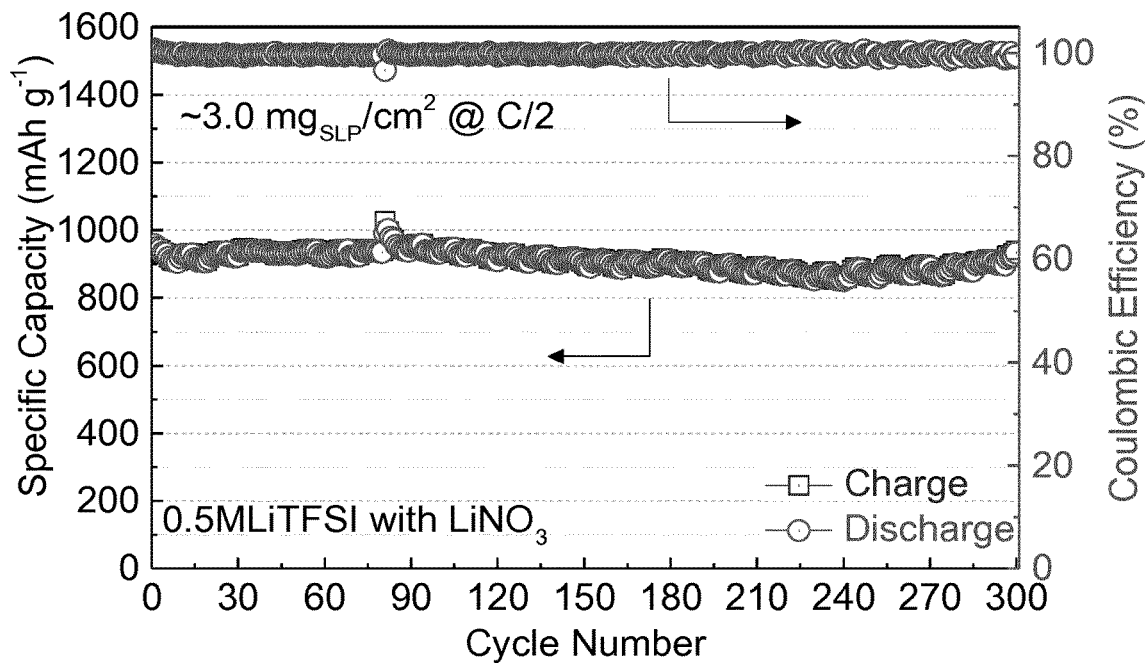

FIG. 13 Long-term cycle stability and coulombic efficiency of a free-standing carbon paper-SLP electrode.

Figure 14:
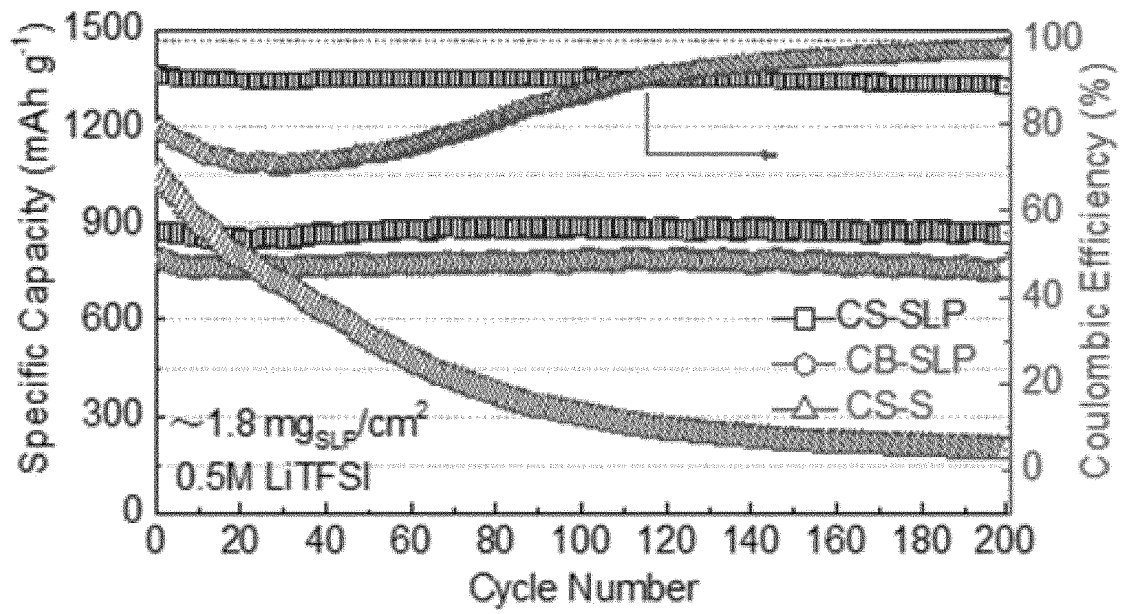

FIG. 14 Electrochemical performance of Li—S batteries based on sulfur-limonene polysulfide (SLP) electrodes (CS-SLP and CB-SLP) and conventional electrodes based on sulfur with carbon spheres (CS-S).

Figure 15:
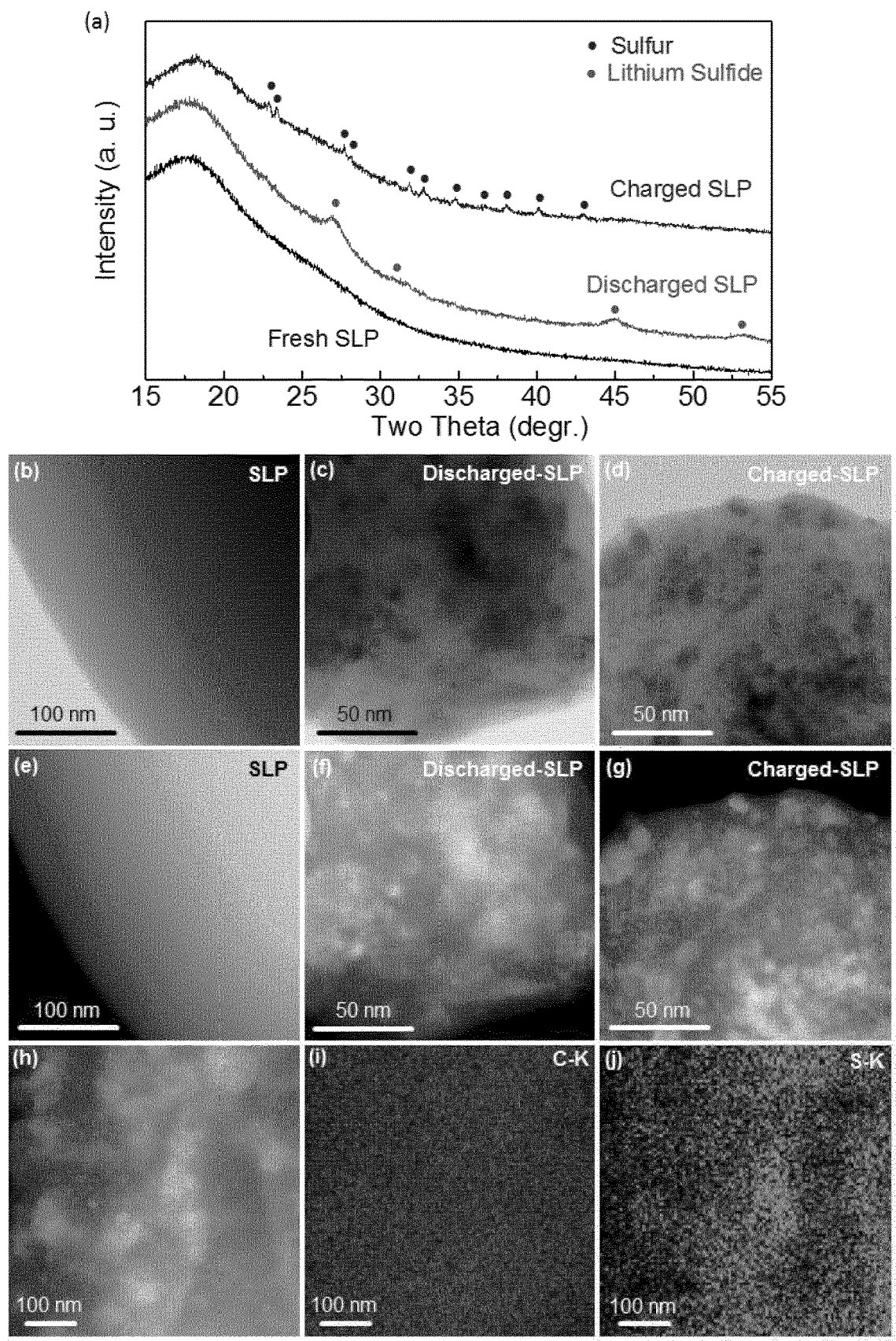

FIG. 15 Ex-situ XRD (a) and STEM (b-j) studies of phase change and nanostructure evolution of sulfur-limonene polysulfide (SLP) during first cycle.

Figure 16:
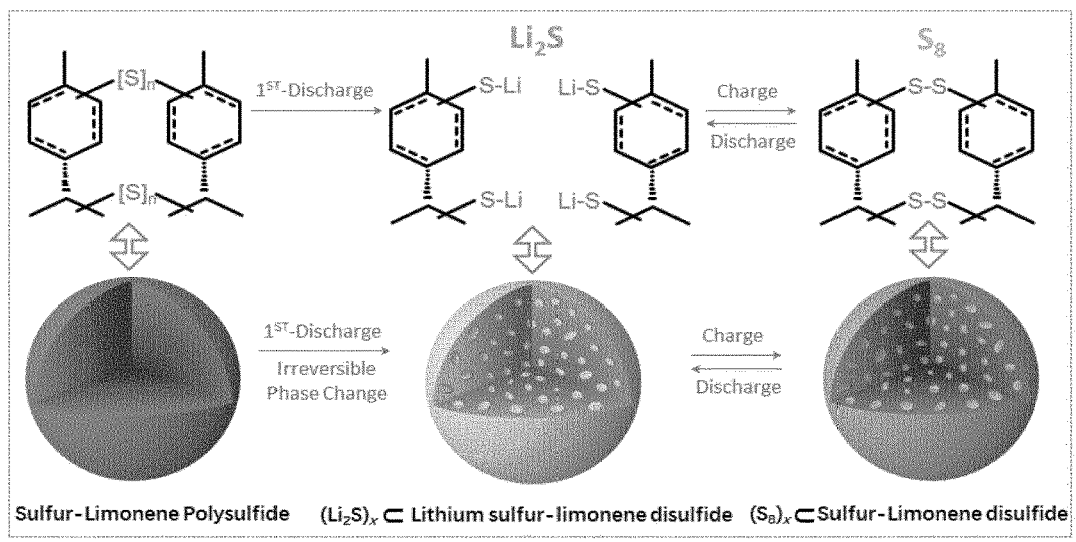

FIG. 16 A schematic illustration of the irreversible conditioning (activation) of sulfur-limonene polysulfide (SLP) and the subsequent reversible redox reaction of sulfur-limonene disulfide.

Figure 17A:
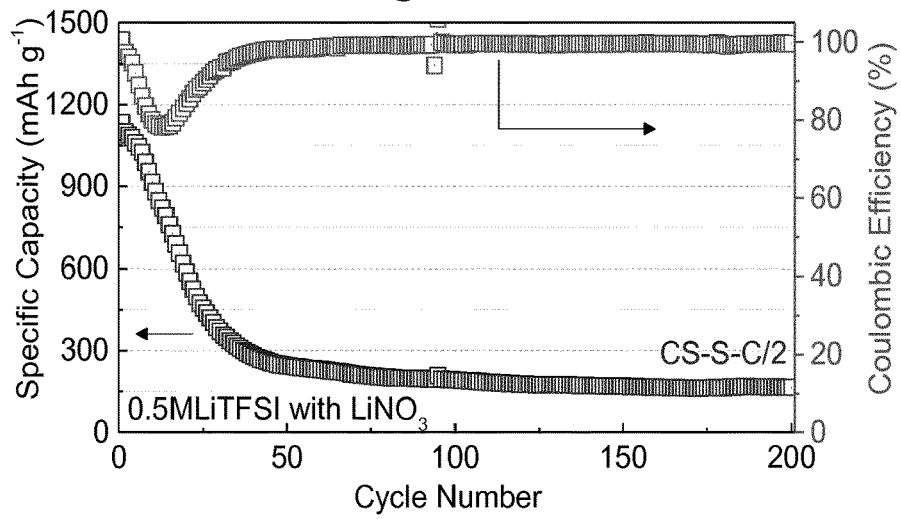

FIG. 17a Cycling performance and coulombic efficiency of CS-S cathode (for the purpose of comparison) at a rate of C/2 using as electrolyte 0.5 M LiTFSI with $LiNO_3$.

Figure 17B:
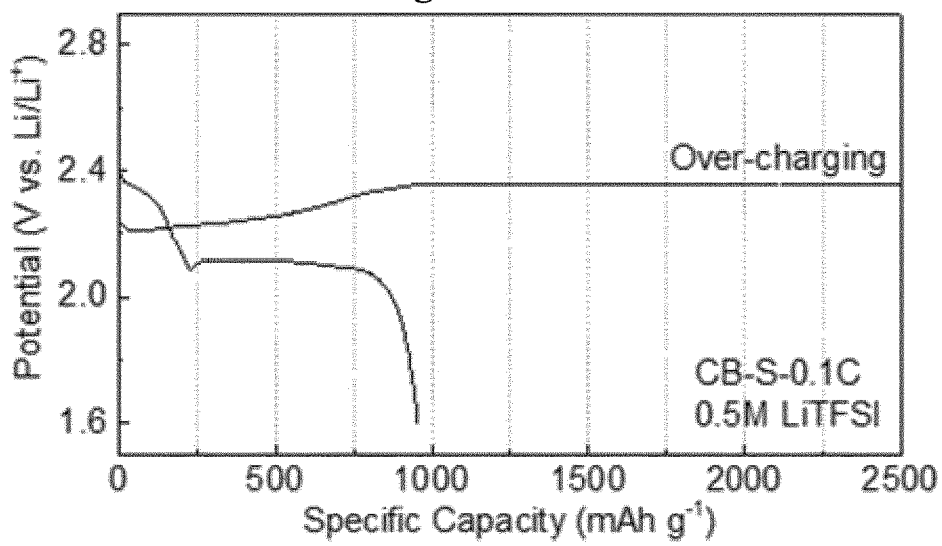

FIG. 17b The initial discharge/charge voltage profile of CB-S cathode at C/10 in the electrolyte comprising 0.5 M LiTFSI without $LiNO_3$.

Figure 18:
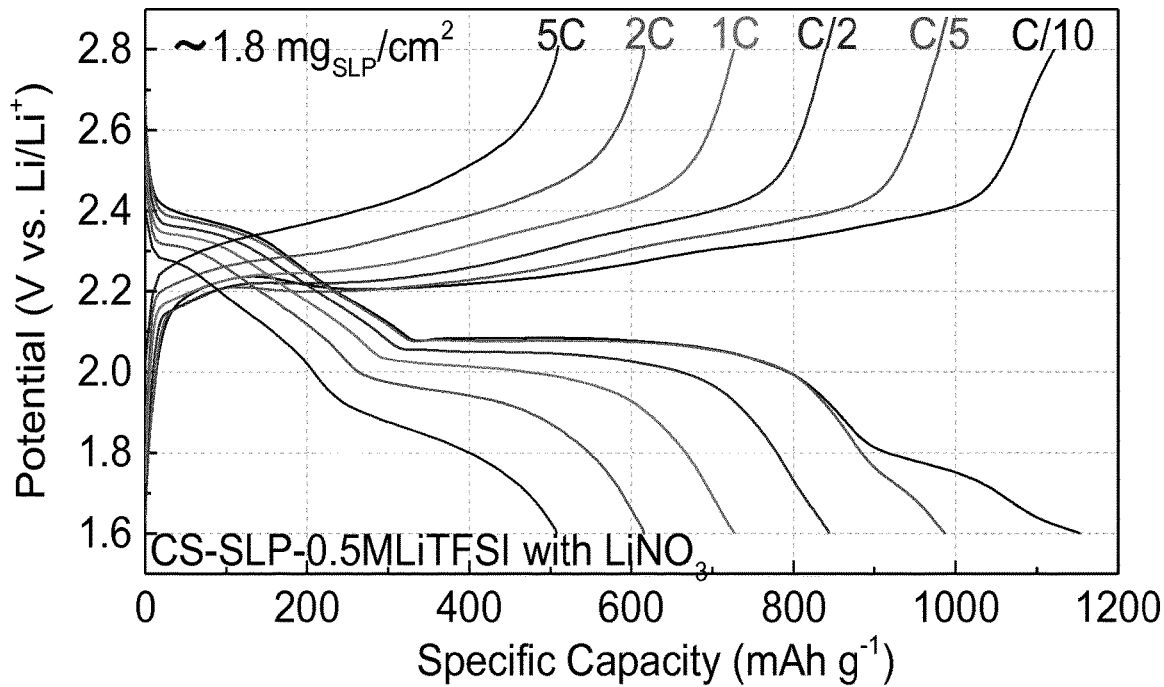
Figure 18:
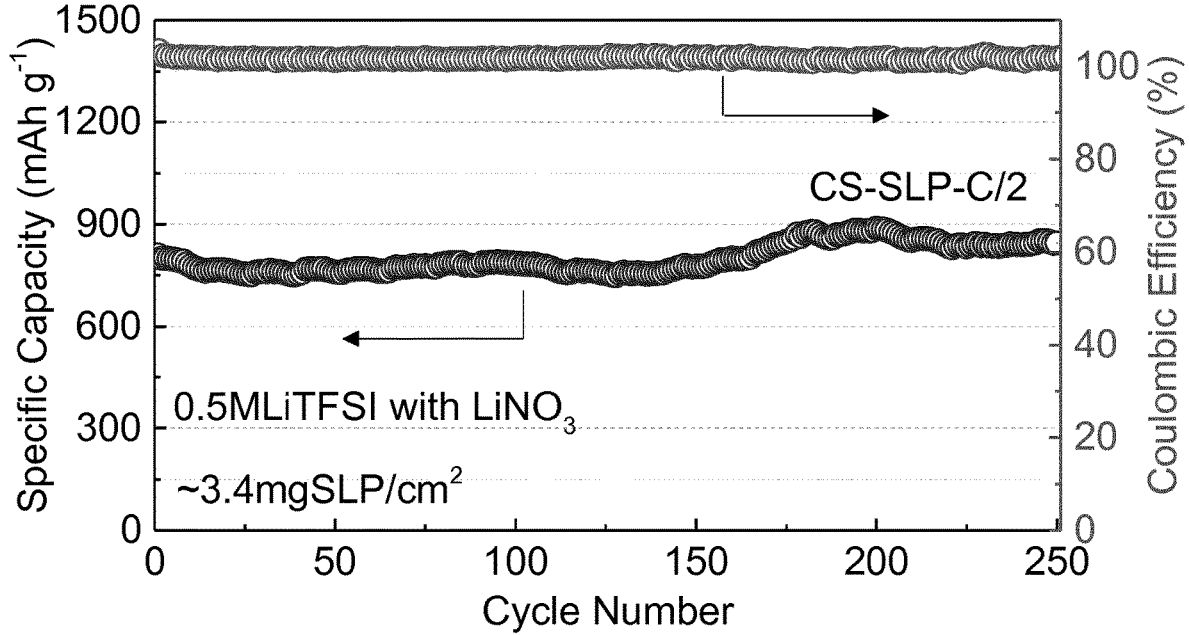

FIG. 18 Discharge/charge voltage profiles of CS-SLP cathode at various C-rates from C/10 to 5C are shown in (a). Long-term cycle stability and coulombic efficiency of produced CS-SLP electrode with mass loading of 3.4 $mg_{SLP}$/$cm^2$ over 250 cycles at C/2 are shown in (b).

Figure 19:
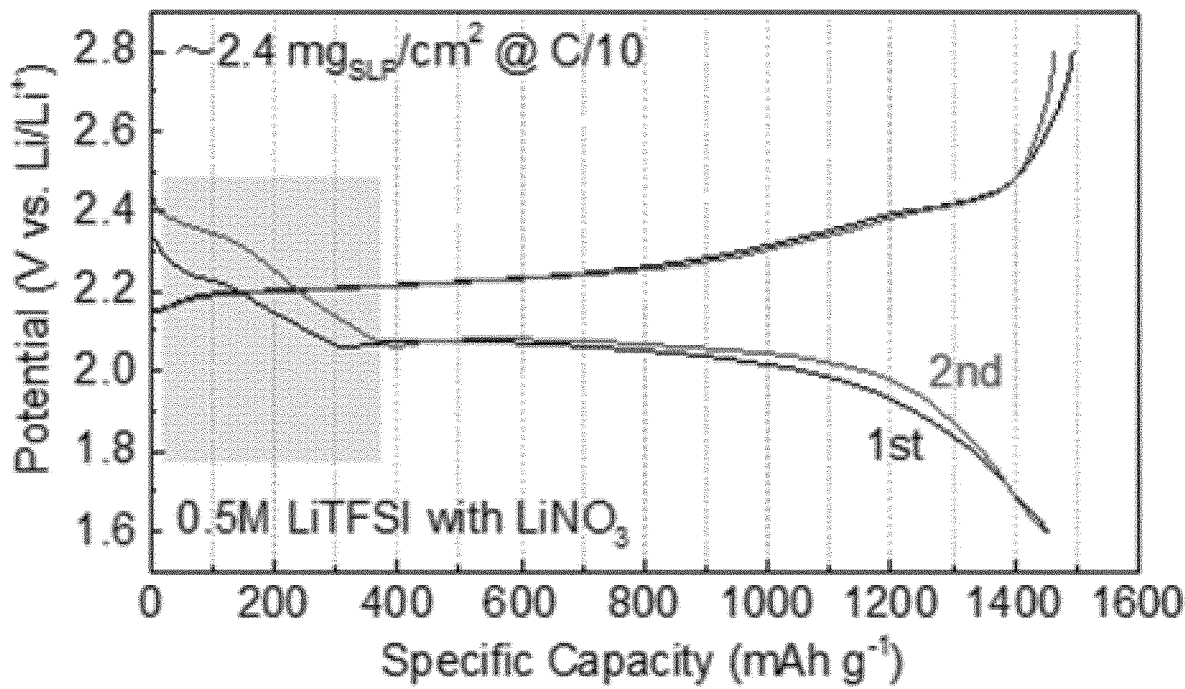

FIG. 19 The initial two discharge/charge voltage profiles of free-standing carbon paper-based SLP cathode at C/10 are shown.

Figure 20:
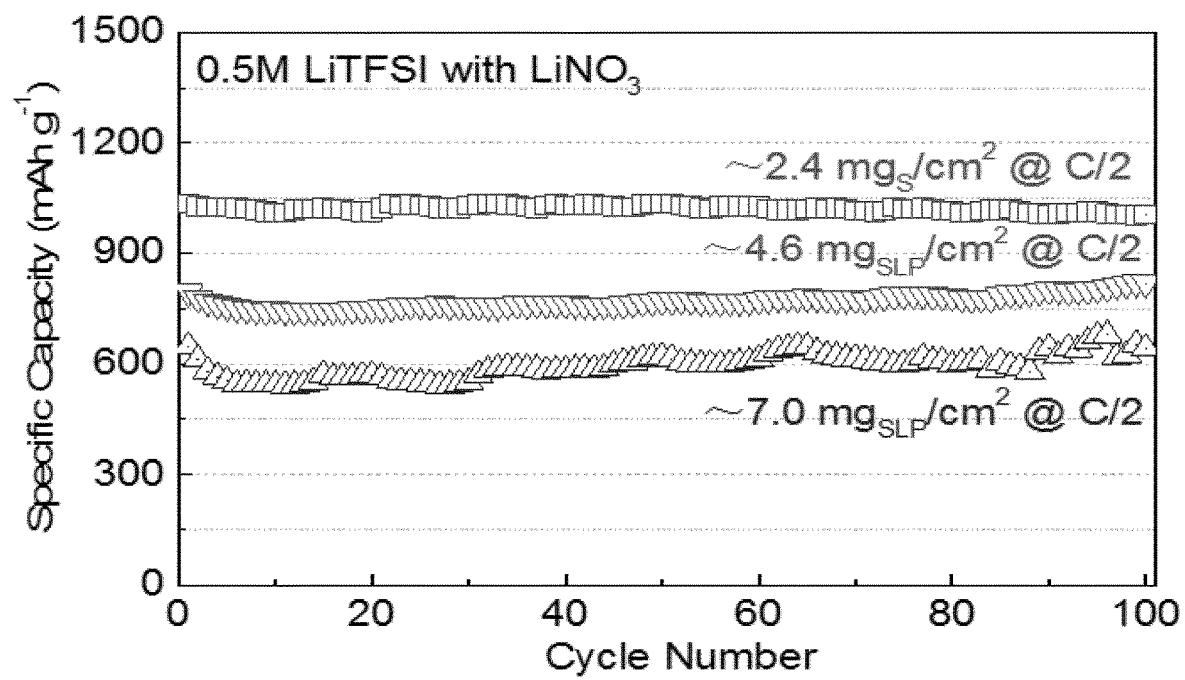

FIG. 20 Free-standing carbon paper-based SLP electrodes: cycling performance at a rate of C/2 using different mass loadings from 2.4 to 7.0 $mg_{SLP}/cm^2$ over 100 cycles.

Figure 21:
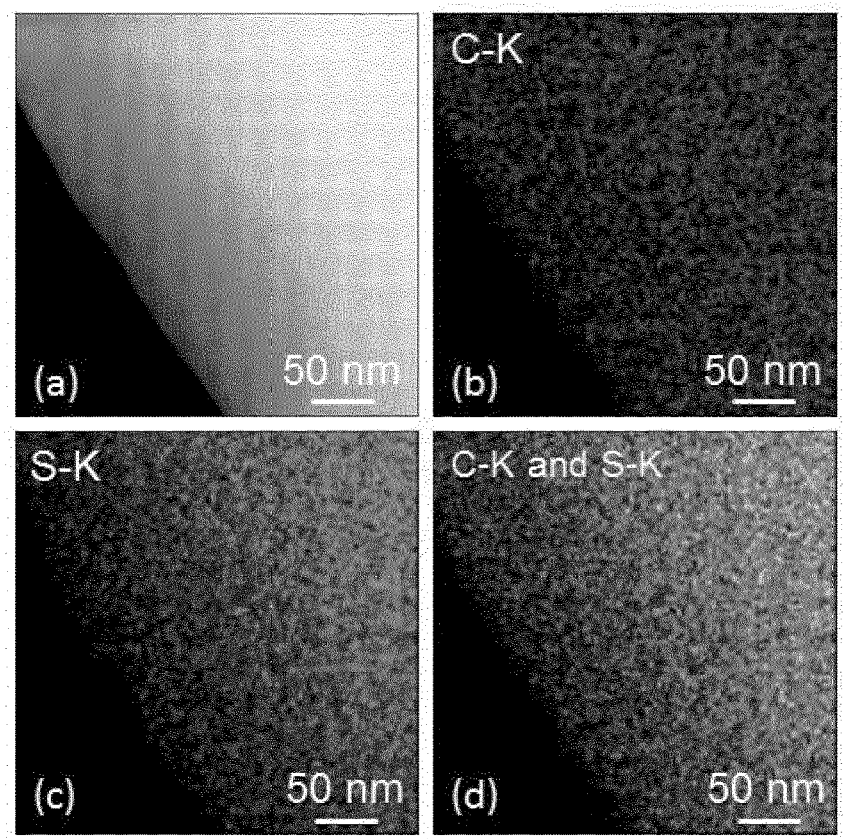

FIG. 21 HAADF-STEM micrograph of (a) fresh SLP and EDS elemental (b) C-K, (c) S-K and (d) their overlapped maps.

Figure 22:
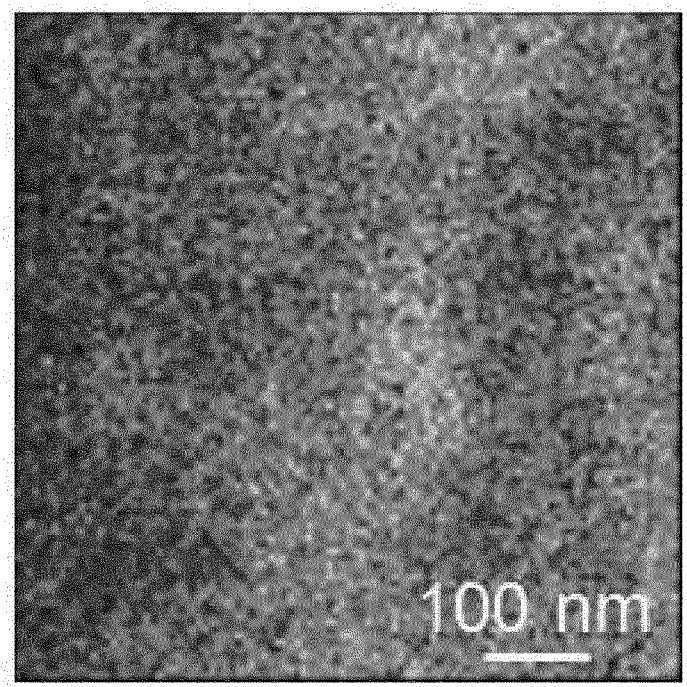

FIG. 22 Overlapped C-K (FIG. 15*i*) and S-K (FIG. 15*j*) EDS elemental maps corresponding to HAADF-STEM image of charged SLP in FIG. 15*h*.

EXAMPLE 1

Synthesis and Preparation of a Battery of the Present Invention 1.1 Synthesis of sulfur-limenene polysulfide (SLP): FIG. 1 shows the chemical synthesis of sulfur-limenene polysulfide (SLP) and its characterizations, in particular of a one-pot synthesis of sulfide-limenene polysulfide (SLP) using D-limonene and sulfur as raw materials (inset photos are showing the low-cost and abundant of raw materials, and the large-scale of this chemical synthesis).

Sulfur (5~50 grams) was added to a beaker or glass vial equipped with a stir bar and heated to 175° C. in an oil bath. Under vigorous stirring, the sulfur was observed to melt and change from a yellow liquid to a dark orange liquid over several minutes. Then, the limonene (5~50 grams) was added into molten sulfur slowly and the two-phase mixture was stirred vigorously for another 4 hours forming dark red material. After above reaction, the dark red material was transferred to vacuum oven for drying under vacuum at 100° C. for 12 hours to form final product of SLP. In this one-pot reaction, the mass ratio between sulfur and limonene is one to one.

Heating elemental sulfur (eight-membered ring: $S_8$) to 175° C. results in $S_8$ ring opening and subsequent polymerization to form linear and polymeric sulfur chains of high molecular weight. Then, D-limonene was oxidized by polymeric sulfur forming SLP with long S—S chains. The by-products of this reaction including p-cymene, thiol and sulfide were volatilized during reaction and vacuum drying, leaving a red wax or rubber-like material depending on its sulfur content. Owing to this simple synthesis route, SLP can be produced from these inexpensive and abundant starting materials on a large scale (FIG. 1 refer to 10-100 g in lab experiments). The $^1H$ NMR spectrum between D-limonene and SLP in FIG. 2*a* indicates oxidation of limonene via emergence of aromatic signals and therefore reveal the successful synthesis of the sulfur-limenene polysulfide (SLP). Clear evidence of the above reaction is also provided by XRD studies (FIG. 2*b*) revealing an amorphous SLP phase and absence of any crystalline sulfur phase. The broad and strong peak at 475 $cm^{-1}$ in the Raman spectrum in FIG. 3 (*a*) can be explained by the symmetric and asymmetric stretching modes of the S—S bond. The IR spectrum in FIG. 3 (*b*) confirms the emergence of aromatic rings, as well as the appearance of C—S and S—S bonds. Combustion analysis indicates an elemental composition of 4.9% H, 36.1% C, and 59% S, corresponding to two limonene units ($C_{20}$) owning twelve sulfur atoms ($S_{12}$).

1.2 Preparation of Carbon-SLP Composites:

In terms of ion-S, preferably Li—S, batteries, SLP offers excellent universality as to the combination with various carbon phases including commercial carbon black, porous carbons, free-standing flexible carbon films or graphene sheets. Here, commercial carbon black (CB), porous carbon sphere (CS) and free-standing carbon paper carbonized by cellulose films were selected as examples to study electrochemical performances of cathodes with and without SLP-nanoconfinement (FIGS. 4, 5, 6*a*, 7 and 8). Appropriate amounts of sulfur-limonene polysulfide (SLP) and a first conductive carbon, preferably selective conductive carbon powders, were mixed at 160° C. in the vial for 4 hours. The final amounts of sulfur-limonene polysulfide (SLP) content in composites was calculated from the mass increase of the conductive carbon before and after preparation. Commercial carbon black (Alfa Aesar, carbon black, Super P, metals basis, >99%, Germany) and porous carbon spheres were used. The amounts of sulfur-limonene polysulfide (SLP) contents in carbon black and carbon sphere were 75% and 72%, respectively.

FIG. 4 shows the preparation of a composite of the sulfur-limonene polysulfide (SLP) with carbon black as first conductive component. Schematic of preparing SLP-carbon composites including commercial carbon black (CB): SEM images show the examples of the carbon black (middle) and carbon black/sulfur-limonene polysulfide (CB-SLP) composite (right). In a typical synthesis, appropriate amounts of SLP and carbon black powders were mixed at 160° C. in the vial for 4 hours. The final SLP content in composites was calculated from the mass increase of the conductive carbon before and after preparation.

FIG. 5 shows the preparation of a composite of the sulfur-limonene polysulfide (SLP) with carbon nanotube as first conductive component. Schematic of preparing SLP-carbon composites including carbon nanotube (CNT): SEM images show the examples of the CNT (middle) and CNT/sulfur-limonene polysulfide (CNT-SLP) composite (right). In a typical synthesis, appropriate amounts of SLP and carbon nanotube powders were mixed at 160° C. in the vial for 4 hours. The final SLP content in composites was calculated from the mass increase of the conductive carbon before and after preparation.

FIG. 6*a* shows a schematic of preparing SLP-carbon composites including highly porous carbon hosts as first conductive component by simple molten mixing/infiltration. Furthermore, the Figure is showing a high universality of SLP in various carbon hosts by a simple approach. SEM images show the examples of the carbon spheres before and after SLP infiltration. EDS elemental mapping results show the success SLP infiltration of SLP in porous carbon spheres. In a typical synthesis, appropriate amounts of SLP and selective conductive carbon powders were mixed at 160° C. in the vial for 4 hours. The final SLP content in the composites was calculated from the mass increase of the conductive carbon before and after preparation. Porous carbon spheres were used.

Large decrease of BET surface area after infiltration (FIG. 6*b*) further indicated successful infiltration of SLP within CS. To be flexible electrodes, SLP was also easily loaded through molten infiltration/soak within porous carbon films forming free-standing electrodes (FIG. 8).

FIG. 7 shows the preparation of a composite of the sulfur-limonene polysulfide (SLP) with graphene as first conductive component. Schematic of preparing SLP-carbon composites including graphene: SEM images show the examples of the graphene (middle) and graphene/sulfur-limonene polysulfide (graphene-SLP) composite (right). In a typical synthesis, appropriate amounts of SLP and graphene powders were mixed at 160° C. in the vial for 4 hours. The final SLP content in composites was calculated from the mass increase of the conductive carbon before and after preparation.

1.3 Preparation of Free-Standing Sulfur-Limonene Polysulfide (SLP) Electrodes:

The free-standing carbon paper used as first conductive component was generated by carbonization of porous cellulose paper at 600° C. for 4 hours with the heating rate of 1° C./min. Then, the carbon paper soaked molten SLP at 160° C., and the mass of SLP on the carbon paper was measured before and after the soak.

FIG. 8 shows the preparation of a composite of the sulfur-limonene polysulfide (SLP) component with porous carbon sheets as first conductive component through melt-infiltration to form a free-standing carbon paper-SLP electrode. Schematic for fabricating free-standing electrodes using sulfur-limonene polysulfide and porous carbon sheets through melt-infiltration. Digital photos show the example of the produced free-standing electrodes using carbonized cellulose sheets.

FIG. 9 shows SEM images of (a) carbonized cellulose film and (b) carbonized cellulose film with loading of sulfur-limonene polysulfide (SLP).

1.4 Cathode Preparation:

Powder of the composite SLP with carbon was mixed with carbon black as a second conductive component (Alfa Aesar, carbon black, super P, metals basis, >99%, Germany) and Carboxymethyl cellulose (MTI, CMC binder, USA) as binder at the weight ratio of 85:5:10 in water with several drops of ethanol to adjust the wetting properties to form a thin slurry. Then the slurry was cast on a battery grade Al foil via doctor-blade technique. After drying the cathode sheets at 60° C. for 12 h under vacuum, circular samples with a diameter of 1.0 cm were punched for electrochemical tests in CR2032 coin cells.

1.5 Coin Cell Assembly:

The free-standing SLP cathodes prepared according to section 1.4 were directly used for cell-assembly. Coin cells were assembled with a 0.5M lithium bis(trifluoromethanesulfonyl)imide (LiTFSI) salt solution in distilled dimethoxyethane (DME):1,3-dioxolane (DIOX) (1:1, v:v) with and without 1 wt % of $LiNO_3$ (Alfa Aesar, anhydrous, 99.99%, USA) additive as electrolyte. Celgard2400 (Celgard, USA) was used as a separator and pure Li foil anode as a counter electrode in half-cells. The cells were equilibrated for 24 h before operation.

EXAMPLE 2

Performance of batteries of the present invention 2.1 Electrochemical Measurements:

The coin-cells of section 1.5 assembled inside an Ar glovebox (<0.2 ppm of $H_2O$, <0.6 ppm of $O_2$, Mbraun, Unilab, Germany) were charged and discharged over a voltage range of 1.6-2.8 V versus Li/Li+ for the electrochemical test under room temperature by using Arbin battery test system (Arbin Instruments, USA) and Neware system (Shenzhen, China). The cells were active at small C-rates and then the cycle durability test was continued at C/2. The specific capacities were calculated based on the mass of sulfur in SLP.

2.2 Materials Characterization

Powder X-ray diffraction (Rigaku D/max-2550V) using Cu-Kα radiation was employed to identify the crystalline phase of the nanocomposite. SEM micrographs have been collected on a field-emission LEO microscope (Zeiss, Germany) at a working distance of 3-6 mm and an accelerating voltage of 2-3 kV. HAADF-STEM imaging combined with EDX measurements were carried out at 60 kV with an advanced analytical TEM/STEM (JEOL ARM200F, JEOL Co. Ltd.), equipped with a cold field-emission gun and a DCOR probe Cs-corrector (CEOS Co. Ltd.). EDX spectra and elemental maps were obtained by using a 100 $mm^2$ JEOL Centurio SDD-EDX detector and the Thermo Noran System 7 EDX system (Thermo Fisher Scientific Inc.). The free-standing SLP electrodes according to section 1.3 without any binder and carbon black cycled at C/10 were used for XRD and TEM studies.

2.3 Results

In order to evaluate the electrochemical performance of SLP-based cathodes, cells were measured in both 0.5M LiTFSI electrolytes (note that it is referred to the inexpensive low-concentration electrolytes) without and with $LiNO_3$ additive (FIGS. 14 and 11). Both SLP with carbon black (CB-SLP) and SLP with carbon spheres (CS-SLP) show high discharge capacities of ~790 and 880 mAh $g^{-1}$ at C/2, respectively, and this with unprecedented cycling stability in both electrolytes. No significant degradation (less than 3-5%) is observed even after 200 cycles as demonstrated in FIGS. 14 and 11. In addition, by passivating the Li metal anode using the $LiNO_3$ additive, the coulombic efficiency (CE) is stable and close to 100% in both CB-SLP and CS-SLP cells (FIG. 11). FIG. 10 displays the rate capability of the CS-SLP cathode for different (dis)charge rates. At C/10 the cell exhibits a capacity as high as ~1160 mAh $g^{-1}$. Even at 5C, a capacity of 510 mAh $g^{-1}$ remains. These high capacities remain essentially unchanged when returned to low current densities, with very good rate capability, excellent capacity retention, and a very high CE (>99.5%) for all currents used (FIG. 10). The details of discharge and charge curves using the CS-SLP composite electrodes at different C rates are evident from FIG. 18(a). For the purpose of demonstrating the application potential, additional cycling tests were conducted using CS-SLP cathodes with higher mass loadings (~3.4 $mg_{SLP/cm}^2$). As depicted in FIG. 18(b), the cell showed a discharge capacity of ~810 mAh $g^{-1}$ at C/2, and excellent cycling performance in 250 cycles with no capacity degradation.

In order to avoid the use of binders and heavy metal foil current collectors, free-standing SLP-based electrodes with demonstrated mass loadings in the range from 2.4 to 7.0 $mg_{SLP}$ $cm^{-2}$ were explored by low-cost carbonized natural biomass sheets through a simple carbonization. The produced cathodes show 1st discharge and charge capacities of up to ~1454 and ~1494 mAh $g^{-1}$s at C/10 (FIG. 19), respectively, characterized by a very high 1st CE of ~98% and a small voltage hysteresis of ~0.15V. In turn, the 2nd cycle shows a discharge capacity of ~1447 mAh $g^{-1}$, indicating absence of a significant irreversible capacity between the initial two cycles. Then, the cell was continuously cycled for 100 times at C/2 (FIG. 12). Neither visible changes nor perceptible polarization occurs, and only minimal fading is observed in all the discharge and charge curves within 100 cycles. FIG. 13 shows longer-term cycling stability data of free-standing sheets with a mass loading of ~3.0 mg $cm^2$. Such cell provides a high (initial) discharge capacity of 956 mAh $g^{-1}$ at C/2, and retains a capacity of 932 mAh $g^{-1}$ at 300th cycle, with a capacity retention of ~98%, a fading rate as low as 0.008% per cycle and an average CE of 99.9% over 300 cycles, demonstrating a good efficiency and kinetics of the battery. The cells produced by mass loadings up to ~7.0 mg of SLP per $cm^2$ still show good discharge capacities and cycle stabilities (FIG. 20). Overall, without any further surface protection, all SLP-based composites with and without nanoconfinement exhibit good cycling stability as a consequence of the internal protection mechanism. As a comparison, elemental sulfur-based composites show under the same experimental conditions very poor cycling capacity retention (FIGS. 14, 17a and 17b). In particular, FIG. 17 (a) shows, compared to SLP-based cathodes, that elemental S-based cells using composites of sulfur and carbon sphere or carbon black offers very poor cycling capacity retention (below 20%) in 200 cycles in both electrolytes and unstable CE (lower than 80% in initial 50 cycles) (FIG. 14 and FIG. 17a), and first over-charging problem in 0.5M LiTFSI (FIG. 17b), respectively, which is known to be due to serious polysulfide dissolution and subsequent shuttle effects. The electrolyte can diffuse into the pores, dissolve the sulfur species, and then diffuse out of the cathode.

The underlying reason for the stable capacity was further explored by examining the phase change and nanostructure evolution on cycling. Particularly revealing are XRD studies on fresh free-standing SLP electrodes, fully discharged SLP and fully charged SLP after the first cycle (see FIG. 15a). FIG. 15a displays the amorphous phase of the original SLP polymer. After 1st discharge, the emergence of a polymeric lithium sulfur-limonene disulfide structure of a new crystalline phase, namely lithium sulfide ($Li_2S$), coexisting with an amorphous material is indicated. This observation is in agreement with lithiation causing cleavage of the S—S bonds in SLP and conversion into $Li_2S$. Then, after charging the cell back, XRD clearly indicates the formation of elemental sulfur ($S_8$) at the expense of the disappearing $Li_2S$ phase thereof forming a polymeric elemental sulfur-limonene disulfide structure containing ($S_8$). Evidently, the SLP exhibits an irreversible phase conversion after the first cycle forming two phases including a polymeric elemental sulfur-limonene disulfide structure containing Sg.

To get a more detailed structural insight, imaging and analytical scanning transmission electron microscopy (STEM) measurements on fresh SLP, fully discharged SLP and fully charged SLP during the first cycle (FIG. 15b-j) were performed. The bright-field (BF)- and high-angle annular dark-field (HAADF)-STEM images exhibit significant changes when comparing fresh and cycled SLP. Fresh SLP (FIG. 15b, e) appears as dense and single phase material without any visible pores. However, after first lithiation, appearance of nanoparticles embedded in the polymer matrix (FIG. 15c, f) is observed. After the first charge process, this nanostructure stays invariant (FIG. 15d, g) in cycled SLP instead of returning to a single phase. The STEM results corroborate the XRD results in FIG. 15a, demonstrating that these new phases are $Li_2S$ (discharge) and Sg (charge). Evidently the first lithiation cracks the poly-sulfur chain of SLP and forms electroactive $Li_2S$ nanoparticles which are uniformly embedded in a nonporous polymeric lithium-sulfur-limonene-disulfide matrix (FIG. 15c, f). The following charging and discharging processes switch the composition of the nanoparticles from $Li_2S$ to Sg in a reversible manner (FIG. 15d, g). This reversibility is enabled by the embedding effect that maintains the nanostructure without binder and impedes access of electrolyte which would cause dissolution of sulfur species. In conjunction with transforming $Li_2S$ to Sg, the Li—S groups of the organic backbone are also reversibly delithiated as can be seen from the unvaried capacity (compare initial two cycles in FIG. 19). Energy-dispersive X-ray spectroscopy (EDS) mapping conducted in STEM mode showed the carbon and sulfur distribution within fresh SLP and cycled SLP (after 1st cycle). In the virgin SLP, carbon and sulfur are uniformly distributed (FIG. 21). In FIG. 15h-j and FIG. 22, elemental carbon stays uniformly distributed within the matrix, but the sulfur mapping exhibits rarefied and rich regions, again confirming the proposed mechanism. The sulfur of the rarefied area stems from the polymer matrix. While obviously the connecting original poly-sulfur chain has been cut, the C—S bonds in SLP are stable during phase conversion on charging and discharging. The sulfur of the rich area stems from the formation of $S_8$ after the first charge. Comparing the voltages between the first discharge and 2nd discharge in FIG. 19, it is clear that the differences between them only affect the high voltage range where sulfur richer polysulfides are involved (marked area in FIG. 19). It can—in view of the charges transferred—be concluded that reactions involving the organic matrix including the redox reaction at the C—S-bonds occur in this voltage regime. The similarity of the 2nd discharge curve with conventional Li—S battery characteristics shows the insensitivity of the cell voltage with respect to size issues. This is directly explained by the similar nanoscale of educts and products. Without intending to be bound by theory, the mechanism of lithiation/delithiation, phase changes and nanostructure evolution of SLP giving rise to high capacity and excellent cycle stability, and can be summarized as depicted in the FIG. 16. During the 1st discharge, the —[$S_n$]— chains of SLP break and tend to locally form $Li_2S$ nanoparticles within the polymeric lithium sulfur-limonene disulfide matrix. This embedded structure is favored by the transport kinetics but is probably also thermodynamically stabilized (interaction of the $Li_2S$ surface with the organic polymeric matrix). This embedding polymeric matrix does not only act as intrinsic binder, but also as a selective protector by allowing Li to exchange but not the solvent to penetrate, hence warranting self-protection. After having formed the embedded structure, the $Li_2S$ nanoparticles are reversibly converted to $S_8$, concomitantly the C—S—Li groups of the polymeric matrix are reversibly delithiated. As a consequence, all the sulfur atoms are electroactive, as obvious from the voltage-capacity curves. Then, sulfur-limonene disulfide and elemental $S_8$ separately undergo redox reactions in the following cycles with $S_8$ and $Li_2S$ staying effectively protected by the nonporous polymeric matrix.

The invention claimed is:

1. An electrode comprising:
   an electrode material, the electrode material comprising at least one of: a sulfur-limonene sulfide component and a composite of the sulfur-limonene sulfide component with a first conductive component,
   and wherein the electrode material is applied to a current collector.

2. The electrode according to claim 1, wherein the electrode material comprises at least one of: sulfur-limonene polysulfide (SLP), and a polymeric sulfur-limonene disulfide structure.

3. The electrode according to claim 2, wherein the polymeric sulfur-limonene disulfide structure is at least one of: a lithium-sulfur-limonene disulfide structure, and an elemental sulfur-limonene disulfide structure.

4. The electrode according to claim 2, wherein the composite of the sulfur-limonene sulfide component with the first conductive component comprises SLP with the first conductive componnent having a SLP content by weight selected from the ranges of: from 50 to 95%, from 65 to 80%, from 70 to 75%, and from 72 to 73%; wherein the SLP content by weight is based on overall weight of the composite of the SLP with the first conductive component.

5. The electrode according to claim 2, wherein the composite of the sulfur-limonene sulfide component with the first conductive component has a content of a polymeric sulfur-limonene disulfide structure by weight selected from the ranges of: from 50 to 95%, from 65 to 80%, from 70 to 75%. and from 72 to 73%, wherein the content by weight is based on overall weight of the composite of the polymeric sulfur-limonene disulfide structure with the first conductive component.

6. The electrode according to claim 1, wherein the first conductive component is at least one of: conductive carbon, porous metal oxide, porous metal sulfide, porous metal hydroxides, and conductive polymer.

7. The electrode according to claim 1, wherein the electrode material comprises at least one of: at least one binder, and at least one second conductive component.

8. The electrode according to claim 7, comprising at least one second conductive component and at least one binder, in a weight ratio of 80 to 90 of the electrode material: 1 to 10 of the second conductive component: 5 to 15 of the at least one binder.

9. The electrode according to claim 8, wherein the at least one second conductive component and at least one binder are present in a weight ratio of 85 of the electrode material: 5 of the second conductive component: 10 of the at least one binder.

10. The electrode according to claim 1, wherein the electrode is a free-standing electrode consisting of a composite of the sulfur-limonene sulfide component with the first conductive component.

11. A battery comprising at least one electrode according to claim 1.

12. A process for preparing the battery according to claim 11, comprising the following steps:
providing an electrode according to claim 1, a second electrode, a separator, and, optionally at least one additive selected from the group consisting of: an elecrolytic solvent, a salt, and an electrolyte, and assembling them to provide a battery.

13. The process according to claim 12, wherein subsequent to the step of assembling the battery is subjected to an activation process.

14. The process of claim 12, wherein the second electrode is a lithium electrode.

15. The electrode of claim 1, wherein the electrode is a free-standing sulfur-limonene polysulfide-electrode consisting of a composite of a sulfur-limonene sulfide component with a first conductive component, wherein the first conductive component is a free-standing first conductive component comprised of at least one of: carbon sheets, graphene sheets, carbonized polymer sheet, CNT papers, carbonized cellulose films, carbonized paper, and carbonized porous cellulose paper.

16. The electrode of claim 1, wherein the electrode is for a lithium sulfur battery.

17. A process for preparing a composite of a sulfur-limonene polysulfide (SLP) with a first conductive component, comprising the following process steps:
providing a sulfur-limonene polysulfide (SLP) and a first conductive component:
contacting the sulfur-limonene polysulfide (SLP) with the first conductive component at an elevated temperature from 100° C. for 3 to 5 hours, and
obtaining the composite of the sulfur-limonene polysulfide (SLP) with the first conductive component.

18. The process of claim 17, wherein the step of contacting the sulfur-limonene polysulfide (SLP) with the first conductive component at an elevated temperature from 100° C. to 200° C. comprises contacting the sulfur-limonene polysulfide (SLP) with the first conductive component at an elevated temperature from 120° C. to 180° C.

19. A process for preparing an electrode material, comprising the following steps:
providing at least one of a sulfur-limonene sulfide component, and a composite of the sulfur-limonene sulfide component with the first conductive component, with at least one of the second conductive material and the binder, in a weight ratio of (80 to 90):(1 to 10):(5 to 15), and
obtaining the electrode material.

20. The process of claim 19, wherein the step of contacting the sulfur-limonene sulfide component, or the composite of the sulfur-limonene sulfide component with the first conductive component, with at least one of the second conductive material and the binder, in a weight ratio of (80 to 90):(1 to 10):(5 to 15), comprises contacting the sulfur-limonene sulfide component, or the composite of the sulfur-limonene sulfide component with the first conductive component, with at least one of the second conductive material and the binder, in a weight ratio of 85:5:10.

* * * * *